United States Patent
Kar et al.

(10) Patent No.: US 9,618,037 B2
(45) Date of Patent: Apr. 11, 2017

(54) APPARATUS AND METHOD FOR IDENTIFYING HEALTH INDICATORS FOR ROLLING ELEMENT BEARINGS

(75) Inventors: Chinmaya Kar, Karnataka (IN); Rajat Sadana, Phoenix, AZ (US); Venkataramana B. Kini, Karnataka (IN); Meenakshi Sunderam, Karnataka (IN); Joydeb Mukherjee, Karnataka (IN); Vedika Agrawal, Delhi (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 1442 days.

(21) Appl. No.: 12/503,783

(22) Filed: Jul. 15, 2009

(65) Prior Publication Data

US 2010/0030492 A1    Feb. 4, 2010

Related U.S. Application Data

(60) Provisional application No. 61/085,637, filed on Aug. 1, 2008.

(51) Int. Cl.
 *G01H 1/00* (2006.01)
 *G01M 13/00* (2006.01)
 (Continued)

(52) U.S. Cl.
 CPC .............. *F16C 19/52* (2013.01); *F16C 41/00* (2013.01); *G01H 1/00* (2013.01); *G01M 13/045* (2013.01); *F16C 2233/00* (2013.01)

(58) Field of Classification Search
 USPC ........................................................ 702/39
 See application file for complete search history.

(56) References Cited

U.S. PATENT DOCUMENTS 2,799,015 A  7/1957 Bell
2,883,255 A  4/1959 Anderson
(Continued)

FOREIGN PATENT DOCUMENTS

EP  1528377 A2  5/2005
EP  1 097 363 B1  12/2007
(Continued)

OTHER PUBLICATIONS

Sugumaran, V. et al., Automatic Rule Learning Using Decision Tree for Fuzzy Classifier in Fault Diagnosis of Roller Bearing, Mechanical Systems and Signal Processing (2007) 2237-2247.*
(Continued)

*Primary Examiner* — Mischita Henson
*Assistant Examiner* — Christine Liao

(57) ABSTRACT

A method includes receiving an input signal containing information associated with a rolling element bearing and/or a piece of equipment containing the rolling element bearing. The method also includes decomposing the input signal into a frequency-domain signal and determining at least one family of frequencies corresponding to at least one failure mode of the rolling element bearing. The method further includes generating a reconstructed input signal using the at least one family of frequencies and the frequency-domain signal. In addition, the method includes determining, using the reconstructed input signal, an indicator identifying an overall health of the rolling element bearing. The indicator could be determined using a baseline signal associated with either (i) normal operation of the rolling element bearing and/or the piece of equipment or (ii) defective operation of the rolling element bearing and/or the piece of equipment (where a severity of the defective operation will increase over time).

20 Claims, 13 Drawing Sheets

(51) Int. Cl.
*F16C 19/52* (2006.01)
*G01M 13/04* (2006.01)
*F16C 41/00* (2006.01)

(56) References Cited

U.S. PATENT DOCUMENTS

| | | |
|---|---|---|
| 3,242,321 A | 3/1966 | Chope |
| 4,060,716 A | 11/1977 | Pekrul et al. |
| 4,237,454 A | 12/1980 | Meyer |
| 4,261,177 A | 4/1981 | Sterlini |
| 4,267,734 A | 5/1981 | Shima et al. |
| 4,286,515 A | 9/1981 | Baumann et al. |
| 4,607,529 A | 8/1986 | Morey |
| 4,675,487 A | 6/1987 | Verkasalo |
| 4,704,191 A | 11/1987 | Wedel |
| 4,758,964 A | 7/1988 | Bittner et al. |
| 4,862,749 A | 9/1989 | Yagi |
| 4,885,707 A | 12/1989 | Nichol et al. |
| 4,931,949 A | 6/1990 | Hernandez et al. |
| 5,149,936 A | 9/1992 | Walton, II |
| 5,262,958 A | 11/1993 | Chui et al. |
| 5,381,697 A | 1/1995 | va der Pol |
| 5,479,824 A | 1/1996 | Torres |
| 5,501,105 A | 3/1996 | Hernandez et al. |
| 5,511,422 A | 4/1996 | Hernandez |
| 5,519,337 A | 5/1996 | Casada |
| 5,533,400 A | 7/1996 | Gasch et al. |
| 5,566,092 A | 10/1996 | Wang et al. |
| 5,594,180 A | 1/1997 | Carpenter et al. |
| 5,616,824 A | 4/1997 | Abdel-Malek et al. |
| 5,641,891 A | 6/1997 | Frankl et al. |
| 5,646,600 A | 7/1997 | Abdel-Malek et al. |
| 5,744,723 A | 4/1998 | Piety |
| 5,750,897 A | 5/1998 | Kato |
| 5,875,420 A | 2/1999 | Piety et al. |
| 5,939,625 A | 8/1999 | Torii et al. |
| 5,943,634 A | 8/1999 | Piety et al. |
| 5,963,884 A | 10/1999 | Billington et al. |
| 5,966,674 A | 10/1999 | Crawford et al. |
| 6,053,047 A | 4/2000 | Dister et al. |
| 6,098,022 A | 8/2000 | Sonnichsen et al. |
| 6,208,943 B1 | 3/2001 | Randolph et al. |
| 6,225,892 B1 | 5/2001 | Chene |
| 6,298,308 B1 | 10/2001 | Reid et al. |
| 6,330,525 B1 | 12/2001 | Hays et al. |
| 6,349,637 B1 | 2/2002 | Molteni |
| 6,370,957 B1* | 4/2002 | Filippenko et al. .......... 73/660 |
| 6,408,676 B1 | 6/2002 | Stratton et al. |
| 6,484,109 B1 | 11/2002 | Lofall |
| 6,505,517 B1 | 1/2003 | Eryurek et al. |
| 6,507,789 B1 | 1/2003 | Reddy et al. |
| 6,526,356 B1 | 2/2003 | DiMaggio et al. |
| 6,526,831 B2* | 3/2003 | Ben-Romdhane .......... 73/660 |
| 6,539,315 B1 | 3/2003 | Adams et al. |
| 6,553,837 B1* | 4/2003 | Lysen .................. G01H 1/003 73/579 |
| 6,567,709 B1 | 5/2003 | Malm et al. |
| 6,629,058 B2 | 9/2003 | Komura et al. |
| 6,634,000 B1 | 10/2003 | Jammu et al. |
| 6,654,697 B1 | 11/2003 | Eryurek et al. |
| 6,657,529 B1 | 12/2003 | Albach |
| 6,681,634 B2 | 1/2004 | Sabini et al. |
| 6,691,249 B1 | 2/2004 | Barford et al. |
| 6,694,285 B1 | 2/2004 | Choe et al. |
| 6,708,291 B1 | 3/2004 | Kidder |
| 6,725,167 B2 | 4/2004 | Grumstrup et al. |
| 6,727,725 B2 | 4/2004 | Devaney et al. |
| 6,757,668 B1 | 6/2004 | Goebel et al. |
| 6,789,422 B1 | 9/2004 | Ward, Jr. |
| 6,802,221 B2 | 10/2004 | Hedeen et al. |
| 6,845,340 B2* | 1/2005 | Edie et al. .................. 702/179 |
| 6,900,420 B2 | 5/2005 | Markegard et al. |
| 6,901,335 B2 | 5/2005 | Wang et al. |
| 6,925,879 B2* | 8/2005 | Raichle .................. 73/579 |
| 6,933,693 B2 | 8/2005 | Schuchmann |
| 6,941,785 B2 | 9/2005 | Haynes et al. |
| 7,027,953 B2 | 4/2006 | Klien |
| 7,099,782 B2 | 8/2006 | Hitchcock et al. |
| 7,257,501 B2 | 8/2007 | Zhan et al. |
| 7,274,995 B2 | 9/2007 | Zhan et al. |
| 7,286,945 B2 | 10/2007 | Zhan et al. |
| 7,289,919 B2 | 10/2007 | Boerhout |
| 7,421,374 B2 | 9/2008 | Zhan et al. |
| 7,509,234 B2 | 3/2009 | Unnikrishnan et al. |
| 7,640,139 B2 | 12/2009 | Sahara et al. |
| 7,640,802 B2 | 1/2010 | King et al. |
| 7,822,580 B2 | 10/2010 | Mustonen |
| 7,912,659 B2 | 3/2011 | Luo |
| 7,945,397 B2 | 5/2011 | Kar |
| 7,970,556 B2 | 6/2011 | Hala et al. |
| 2002/0020144 A1 | 2/2002 | Sarles et al. |
| 2002/0152052 A1 | 10/2002 | Tsuru |
| 2002/0169569 A1* | 11/2002 | Miller ..................... 702/56 |
| 2003/0019297 A1 | 1/2003 | Fiebelkorn et al. |
| 2003/0216888 A1 | 11/2003 | Ridolfo |
| 2004/0024568 A1 | 2/2004 | Eryurek et al. |
| 2004/0034483 A1 | 2/2004 | Sonnichsen et al. |
| 2004/0049357 A1 | 3/2004 | Delvaux et al. |
| 2004/0159112 A1 | 8/2004 | Jayanth et al. |
| 2004/0199828 A1 | 10/2004 | Cabezas et al. |
| 2005/0096873 A1 | 5/2005 | Klein |
| 2005/0104020 A1 | 5/2005 | Zhan et al. |
| 2006/0025970 A1 | 2/2006 | Wegerich |
| 2006/0071666 A1 | 4/2006 | Unsworth et al. |
| 2007/0006636 A1 | 1/2007 | King et al. |
| 2007/0032966 A1 | 2/2007 | Song |
| 2007/0088534 A1 | 4/2007 | MacArthur et al. |
| 2008/0033695 A1 | 2/2008 | Sahara et al. |
| 2009/0049338 A1 | 2/2009 | Unnikrishnan et al. |
| 2009/0301198 A1* | 12/2009 | Sohn ............... G01N 29/069 73/598 |
| 2010/0030492 A1 | 2/2010 | Kar et al. |
| 2010/0106458 A1 | 4/2010 | Leu et al. |
| 2010/0145639 A1 | 6/2010 | Fu et al. |
| 2010/0198534 A1 | 8/2010 | Hala et al. |
| 2010/0256932 A1 | 10/2010 | Kar |
| 2010/0256953 A1 | 10/2010 | Kar |
| 2011/0135415 A1 | 6/2011 | Hamaguchi et al. |
| 2011/0156921 A1 | 6/2011 | Kyllingstad |
| 2011/0213571 A1 | 9/2011 | Sihler et al. |
| 2011/0290024 A1 | 12/2011 | Lefler |
| 2011/0307218 A1 | 12/2011 | Kar et al. |
| 2012/0107094 A1 | 5/2012 | Lillis |
| 2012/0330578 A1 | 12/2012 | Kar et al. |
| 2012/0330614 A1 | 12/2012 | Kar |
| 2013/0049733 A1 | 2/2013 | Neti et al. |
| 2013/0207810 A1 | 8/2013 | Kar et al. |

FOREIGN PATENT DOCUMENTS

| | | |
|---|---|---|
| JP | 62226033 | 10/1987 |
| JP | 407190849 A | 7/1995 |
| JP | 2005147081 | 6/2005 |
| KR | 20030048779 A | 6/2003 |
| KR | 20050011919 A | 1/2005 |
| WO | WO 00/04361 A1 | 1/2000 |
| WO | WO 03/090091 A2 | 10/2003 |

OTHER PUBLICATIONS

Laibin Zhang, et al., "Short-term fault prediction of mechanical rotating parts on the basis of fuzzy-grey optimising method", Mechanical Systems and Signal Processing 21 (2007), p. 856-865.

Michael J. Devaney, et al., "Detecting Motor Bearing Faults", IEEE Instrumentation & Measurements Magazine, Dec. 2004, p. 30-35 & 50.

Jason R. Stack, et al., "Fault Classification and Fault Signature Production for Rolling Element Bearings in Electric Machines", IEEE Transactions on Industry Applications, vol. 40, No. 6 May/Jun. 2004, p. 735-739.

Peter W. Tse, et al., "Wavelet Analysis and Envelope Detection for Rolling Element Bearing Fault Diagnosis—Their Effectiveness and

(56) References Cited

OTHER PUBLICATIONS

Flexibilities", Journal of Vibration and Acoustics, Jul. 2001, vol. 123, p. 303-310.
V. Sugumaran, et al., "Automatic rule learning using decision tree for fuzzy classifier in fault diagnosis of roller bearing", Mechanical Systems and Signal Processing 21 (2007), p. 2237-2247.
Yaguo Lei, et al., "Fault diagnosis of rotating machinery based on multiple ANFIS combination with GA s", Mechanical Systems and Signal Processing 21 (2007), p. 2280-2294.
Jason R. Stack, et al., "An Amplitude Modulation Detector for Fault Diagnosis in Rolling Element Bearings", IEEE Transactions on Industrial Electronics, vol. 51, No. 5, Oct. 2004, p. 1097-1102.
Robert B. Randall, "State of the Art in Monitoring Rotating Machinery—Part 1", Sound and Vibration, Mar. 2004, p. 14-20.
Z.K. Peng, et al., "A comparison study of improved Hilbert-Huang transform and wavelet transform: Application to Fault disgnosis for rolling bearing", Mechanical Systems and Signal Processing 19 (2005), p. 974-988.
Xinsheng Lou, et al., "Bearing fault diagnosis based on wavelet transform and fuzzy inference", Mechanical Systems and Signal Processing 18 (2004) p. 1077-1095.
T.I. Liu, et al., "Detection of Roller Bearing Defects Using Expert System and Fuzzy Logic", Mechanical Systems and Signal Processing (1996) 10(5), p. 595-614.
Yaguo Lei, et al., "A new approach to intelligent fault diagnosis of rotating machinery", Expert Systems with Applictaions 35 (2008), p. 1593-1600.
Paula J. Dempsey, et al., "Tapered Roller Bearing Damage Detection Using Decision Fusion Analysis", NASA/TM-2006-21430, Jul. 2006, 23 pages.
A.R. Mohanty, et al., "Fault Detection in a Multistage Gearbox by Demodulation of Motor Current Waveform", IEEE Transactions on Industrial Electronics, vol. 53, No. 4, Aug. 2006, p. 1285-1297.
Chinmaya Kar, et al., "Vibration and current transient monitoring for gearbox fault detection using multiresolution Fourier transform", Journal of Sound and Vibration 311 (2008), p. 109-132.
Chinmaya Kar, et al., "Monitoring gear vibrations through motor current signature analysis and wavelet transform", Mechanical Systems and Signal Processing 20 (2006), p. 158-187.
T. Lindth et al., "Automatic bearing fault classification combining statistical classification and fuzzy logic", 4th Nordic Workshop in Power & Industrial Electronics, Jun. 2004, 5 pages.
Notification of Transmittal of the International Search Report and The Written Opinion of the International Searching Authority, or the Declaration dated Dec. 7, 2011 in connection with International Patent Application No. PCT/US2011/038856.
International Search Report dated Apr. 14, 2005 in connection with International Application No. PCT/US2004/038766; 2 pages.
International Search Report dated Dec. 9, 2010 in connection with International Application No. PCT/US2010/028258; 4 pages.
Written Opinion of International Searching Authority dated Dec. 9, 2010 in connection with International Application No. PCT/US2010/028258; 3 pages.
European Search Report dated Jun. 5, 2013 in connection with European Patent Application No. EP13152505; 3 pages.
Non-Final Office Action dated Sep. 29, 2014 in connection with U.S. Appl. No. 13/166,098; 17 pages.
Non-Final Office Action dated Oct. 8, 2014 in connection with U.S. Appl. No. 13/166,205; 12 pages.
Amin, et al.; "Fuzzy Inference and Fusion for Health State Diagnosis of Hydraulic Pumps and Motors"; FIPS-NAFIPS 2005; IEEE; Jun. 26-28, 2005; 6 pages.
Billings, et al.; "Discrete Wavelet Models for Identification and Qualitative Analysis of Chaotic Systems"; Singapore; SG; vol. 9, Issue 7; Jul. 1999; 22 pages.
Braun, Simon G.; "The Signature Analysis of Sonic Bearing Vibrations"; IEEE Trans on Sonics and Ultrasonics; vol. 27, Issue 6; Nov. 1980; 11 pages.
Byington, et al.; "In-Line Health Monitoring System for Hydraulic Pumps and Motors"; 2003 Aerospace Conference; IEEE; vol. 7; 9 pages.

Friedman, A.; "Automated Bearing Wear Detection"; Published in Vibration Institute Proceedings; 2004; 10 pages.
Gao, et al.; "Support Vector Machines Based Approach for Fault Diagnosis of Valves in Reciprocating Pumps"; IEEE CCECE 2002; vol. 3; 6 pages.
Gao, et al.; "Wavelet-Based Pressure Analysis for Hydraulic Pump Health Diagnosis"; Transactions of the ASAE; vol. 46(4); 2003; 8 pages.
Goebel, Kai F.; "Conflict Resolution Using Strengthening and Weakening Operations in Decision Fusion"; Proc. 4th Annual Conf. Information Fusion; Fusion 2001; 7 pages.
He, et al.; "WPT-SVMs Based Approach for Fault Detection of Valves in Reciprocating Pumps"; 2002 American Control Conf; vol. 6; IEEE; 5 pages.
Horch, A.; "A Simple Method for Detection of Stiction in Control Valves"; Control Engineering Practice 7; 1999; 11 pages.
Lathi, B.P.; "Linear Systems and Signals"; 1992 Berkeley-Cambridge Press; 9 pages.
Mallat, et al.; "Singularity Detection and Processing with Wavelets"; IEEE Trans on Info Theory; vol. 38, Issue 2; Mar. 1992; 22 pages.
Nounou, et al.; "Multiscale Fuzzy System Identification"; Journal of Process Control; vol. 15, Issue 7; Oct. 2005; 8 pages.
Parvez, et al.; "A Wavelet-Based Multi-Resolution PID Controller"; IEEE Trans on Industry Applications; vol. 41, Issue 2; Mar.-Apr. 2005; 5 pages.
Ren, et al.; "Fault Feature Extracting by Wavelet Transform for Control System Fault Detection and Diagnosis"; IEEE Intl Conf on Control Applications; 2000; 5 pages.
Wang, et al.; "The Fault Character of the Motors Identified Based on Wavelet Transform"; 2nd Intl Conf on Machine Learning and Cybermetics; Nov. 2-5, 2003; 5 pages.
Wanlu, et al.; "Applying Multiresolution Analysis for Processing of Hydraulic Pump Fault Signal"; 5th ICPF; Hebei, P.R. China; 2001; 5 pages.
Xia, et al.; "Nonlinear Adaptive Predictive Control Based on Orthogonal Wavelet Networks"; 4th World Congress on Intelligent Control & Automation; 2002; 7 pages.
Xu, et al.; "Design of Fault Detection and Isolation Via Wavelet Analysis and Neural Network"; IEEE Intl Symposium on Intelligent Control; 2002; 6 pages.
Zhihuan, et al.; "Adaptive Predictive Control Based on Wavelet Approximation Models"; IEEE Intl Conf on Systems, Man, and Cybermetics; Oct. 14-17, 1996; Beijing; 5 pages.
"ALERT™ Process Data Logger, Machine Performance Monitoring for Machine Condition Analysis"; DLI Engineering Corporation; 2008; 2 pages.
DLI Watchman® PR-1/PR-2, Vibration Precision Reference Calibrators; DLI Engineering Corporation; 2007; 2 pages.
"Efficient Vibration Condition Assessment, Methodology Overview"; DLI Engineering Corporation; 2002; 2 pages.
"SprintMAX™, Online Monitoring & Diagnostic System"; DLI Engineering Corporation; 2005; 8 pages.
"The Technology of ExpertALERT™, Intelligent Machine Condition Assessment Software"; DLI Engineering Corporation; 2007; 4 pages.
Non-Final Office Action dated Aug. 3, 2015 in connection with U.S. Appl. No. 13/166,205; 20 pages.
Non-Final Office Action dated Aug. 7, 2015 in connection with U.S. Appl. No. 13/66,524; 26 pages.
Abe, et al.; "Energy Materials"; retrieved from www.maneyonline.com; Mar. 2006; Published Jointly with Institue of Materials and Mining (IOM3); 4 pages.
Yang, et al.; "An Efficient Method of Vibration Diagnostics for Rotating Machinery Using a Decision Tree"; Intl Journal of Rotating Machinery 6.1; 2000; 9 pages.
U.S. Office Action issued for U.S. Appl. No. 13/166,205 dated Mar. 4, 2016, 24 pgs.
U.S. Office Action issued for U.S. Appl. No. 13/166,524 dated Jan. 12, 2016, 28 pgs.

\* cited by examiner

| | A | B |
|---|---|---|
| 1 | NORMAL BEARING | |
| 2 | Frequency [Hz] | Amplitude [m/s-2] |
| 3 | 20.67534361 | 1.85E-05 |
| 4 | 90.10478546 | 0.016332289 |
| 5 | 100.6133279 | 0.001783252 |
| 6 | 130.0737776 | 0.000510973 |
| 7 | 159.5342273 | 0.005210043 |
| 8 | 180.2095709 | 0.003493448 |
| 9 | 188.994677 | 0.000119915 |
| 10 | 218.4551268 | 9.16E-05 |
| 11 | 228.9636692 | 0.000198261 |
| 12 | 249.6390128 | 0.001064743 |
| 13 | 260.1475552 | 0.000412914 |
| 14 | 289.6080049 | 0.000191272 |
| 15 | 298.393111 | 0.000113167 |
| 16 | 319.0684546 | 0.00027801 |
| 17 | 339.7437982 | 0.000465027 |
| 18 | 348.5289043 | 0.00026888 |
| 19 | 377.9893541 | 0.000184818 |
| 20 | 388.4978965 | 0.000108918 |
| 21 | 409.1732401 | 9.07E-05 |
| 22 | 419.6817825 | 0.000127857 |
| 23 | 449.1422322 | 0.000214971 |
| 24 | 457.9273383 | 6.45E-05 |

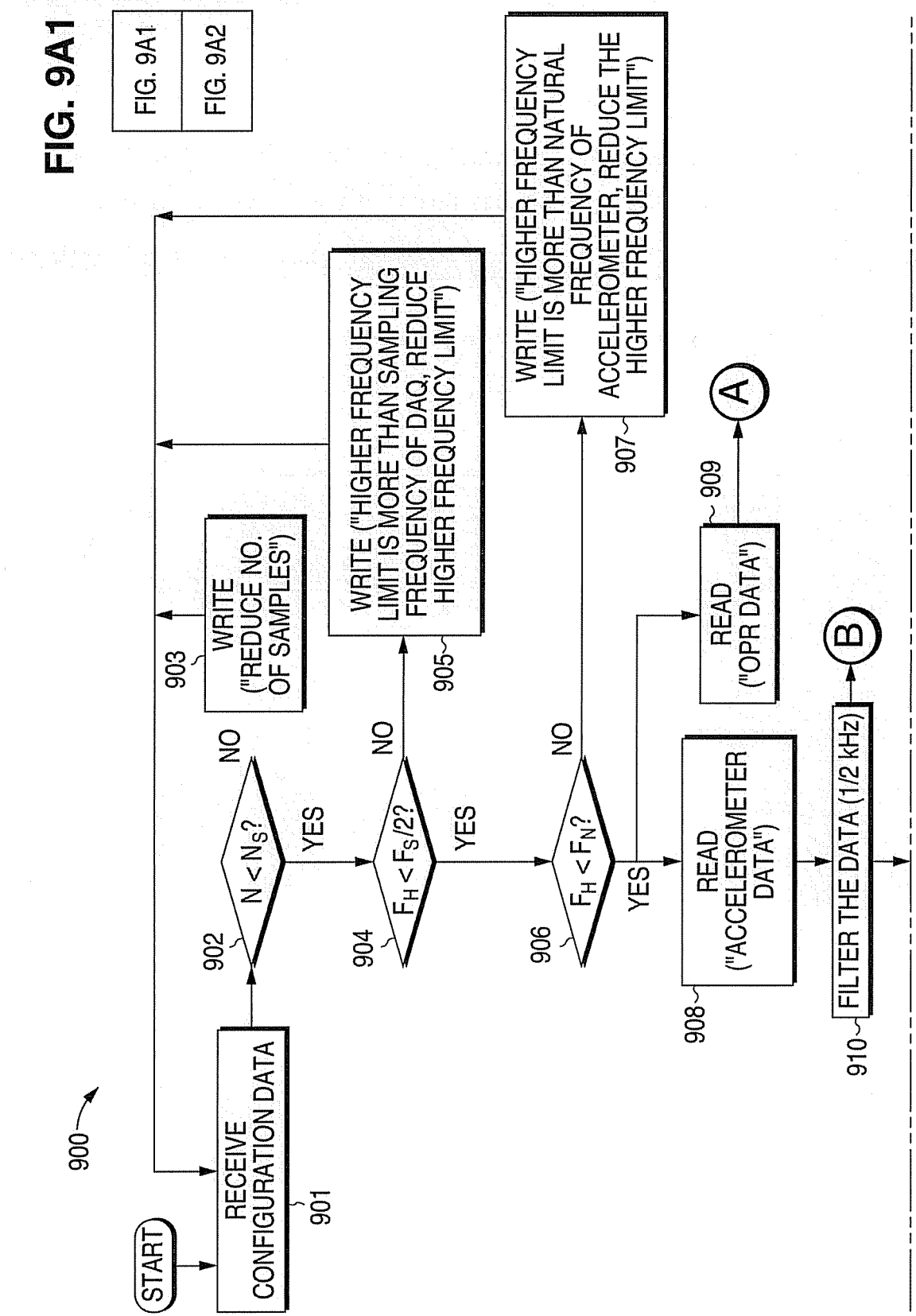
FIG. 9A1

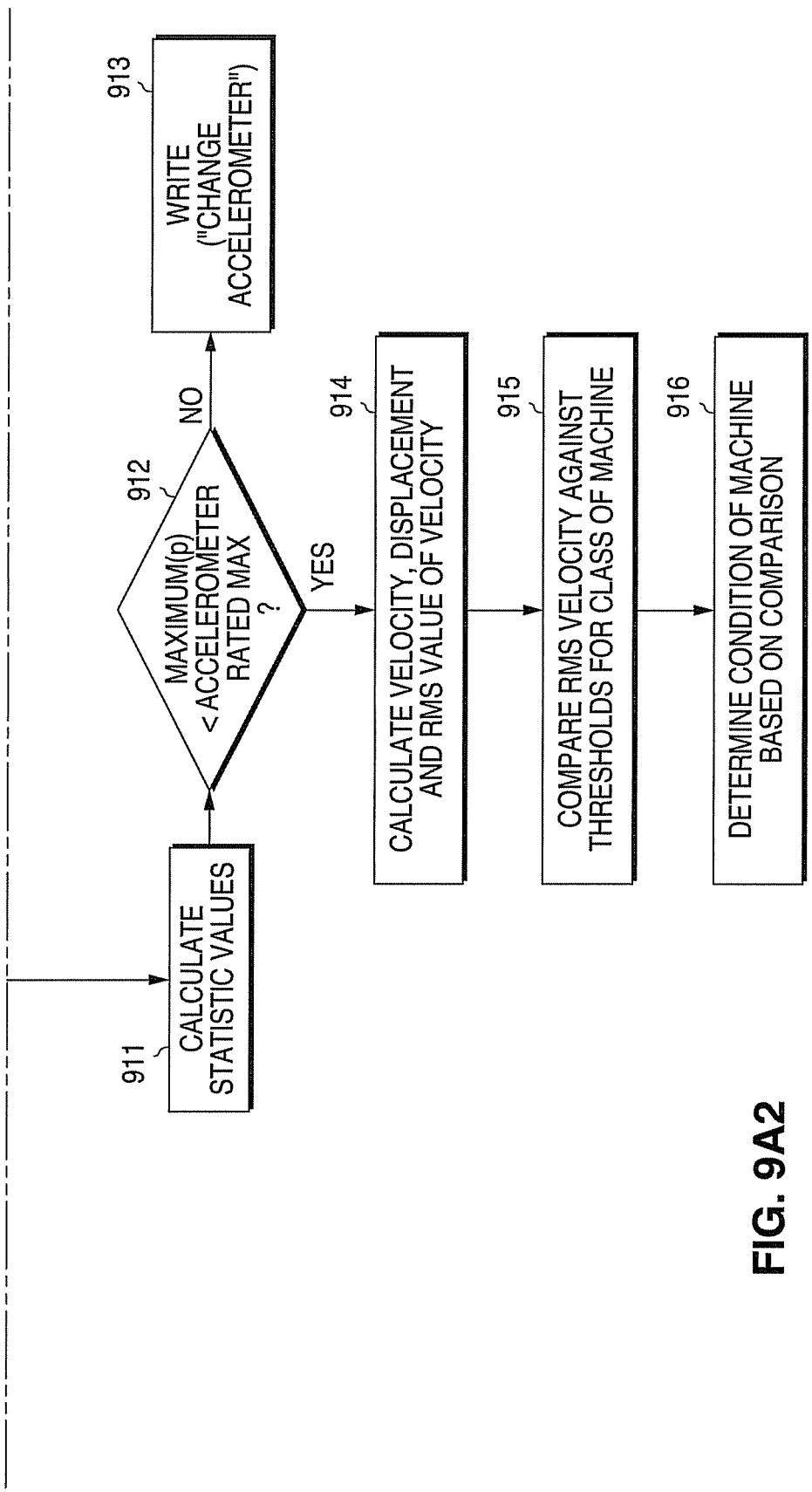
FIG. 9A2

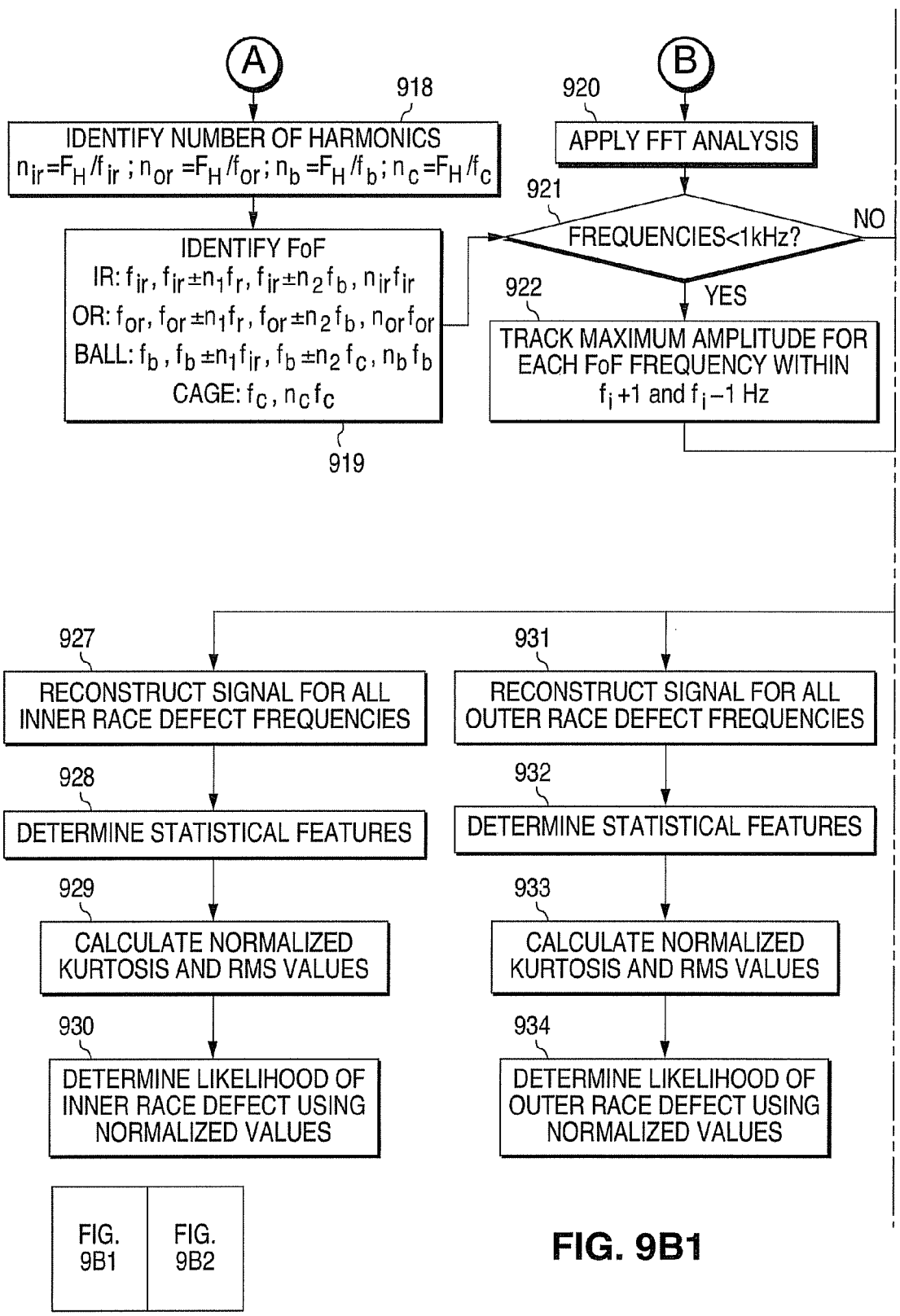
FIG. 9B1

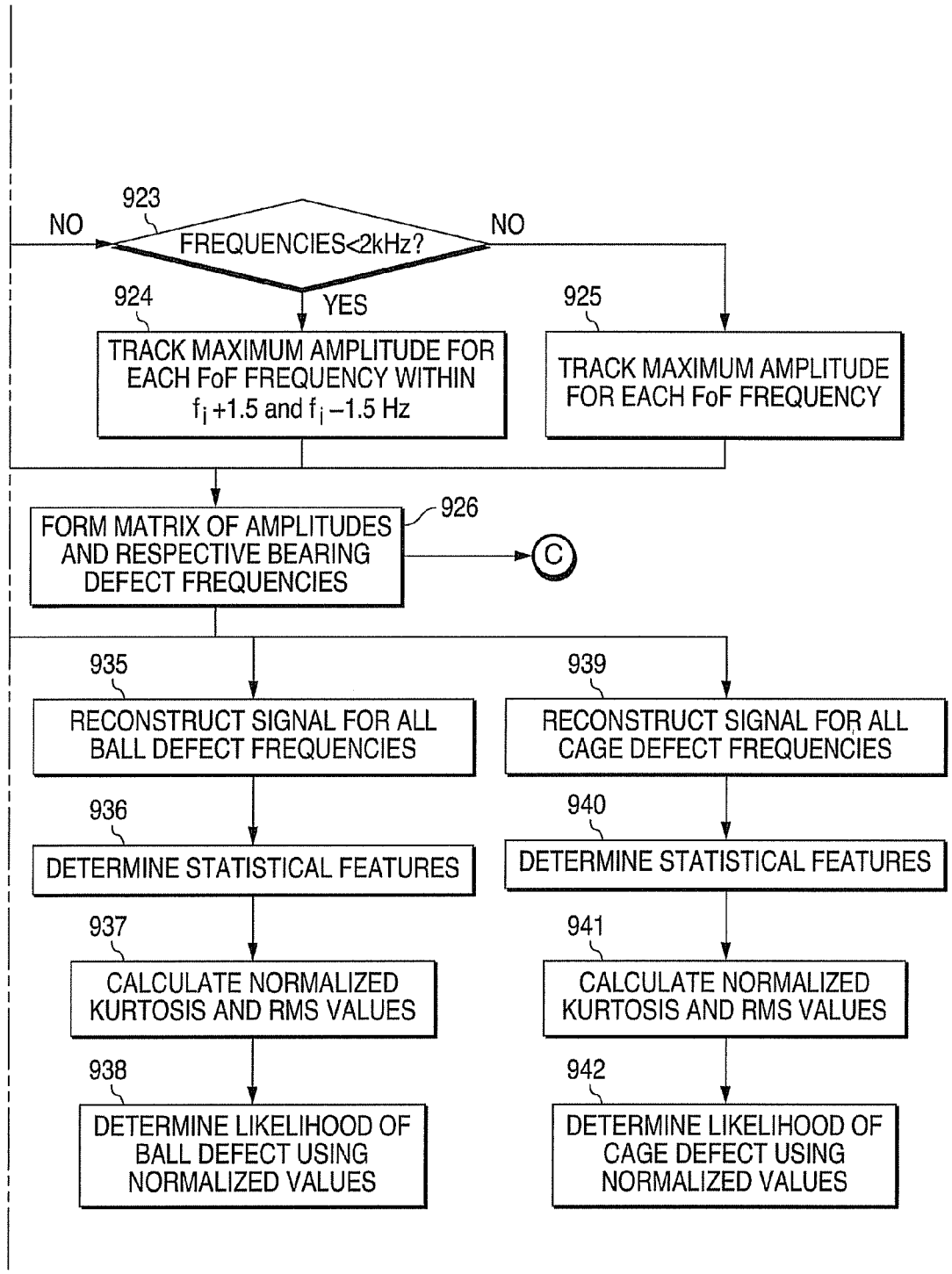
FIG. 9B2

| VIBRATION SEVERITY PER ISO 10816-1 ||||||
| Machine || Class I Small Machines | Class II Medium Machines | Class III Large Rigid Foundation | Class IV Large Soft Foundation |
| in/s | mm/s ||||| 
| 0.01 | 0.28 | | | | |
| 0.02 | 0.45 | | | | |
| 0.03 | 0.71 | Good ||||
| 0.04 | 1.12 | | | | |
| 0.07 | 1.80 | | | | |
| 0.11 | 2.80 | | Satisfactory |||
| 0.18 | 4.50 | | | | |
| 0.28 | 7.10 | | Unsatisfactory |||
| 0.44 | 11.2 | | | | |
| 0.70 | 18.0 | | | | |
| 1.10 | 28.0 | | Unacceptable |||
| 1.77 | 45.9 | | | | |

(Vibration Velocity Vrms)

APPARATUS AND METHOD FOR IDENTIFYING HEALTH INDICATORS FOR ROLLING ELEMENT BEARINGS

CROSS-REFERENCE TO RELATED APPLICATIONS

This application claims priority under 35 U.S.C. §119(e) to U.S. Provisional Patent Application No. 61/085,637 filed on Aug. 1, 2008, which is hereby incorporated by reference.

TECHNICAL FIELD

This disclosure relates generally to monitoring systems and more specifically to an apparatus and method for identifying health indicators for rolling element bearings.

BACKGROUND

Rolling element bearings are one of the most common and frequently failing components in rotating machinery. A rolling element bearing often includes the following four subcomponents: bearing balls, a cage, an outer race, and an inner race. The bearing balls typically move during rotation of a machinery element, and the cage typically helps to maintain separation of the balls. Each race is typically a grooved ring, and the bearing balls move between the races.

A crack, indentation, or wear in any one of these subcomponents often requires replacement of the entire rolling element bearing. Not only that, the failure of a rolling element bearing often causes immense secondary damage, such as shaft misalignment, rub, stator insulation failure, and gear failure. Therefore, the monitoring of the condition of a rolling element bearing is often an important activity in many industries.

SUMMARY

This disclosure provides an apparatus and method for identifying health indicators for rolling element bearings.

In a first embodiment, a method includes receiving an input signal containing information associated with a rolling element bearing and/or a piece of equipment containing the rolling element bearing. The method also includes decomposing the input signal into a frequency-domain signal and determining at least one family of frequencies corresponding to at least one failure mode of the rolling element bearing. The method further includes generating a reconstructed input signal using the at least one family of frequencies and the frequency-domain signal. In addition, the method includes determining, using the reconstructed input signal, an indicator identifying an overall health of the rolling element bearing.

In a second embodiment, an apparatus includes at least one interface configured to receive an input signal containing information associated with a rolling element bearing and/or a piece of equipment containing the rolling element bearing. The apparatus also includes at least one processing device configured to decompose the input signal into a frequency-domain signal and to determine a family of frequencies corresponding to a failure mode of the rolling element bearing. The at least one processing device is also configured to generate a reconstructed input signal using the family of frequencies and the frequency-domain signal and to determine, using the reconstructed input signal, a value identifying a likelihood that the rolling element bearing is suffering from a defect associated with the failure mode.

In a third embodiment, a computer readable medium embodies a computer program. The computer program includes computer readable program code for decomposing an input signal to produce a frequency-domain signal, where the input signal contains information associated with a rolling element bearing and/or a piece of equipment containing the rolling element bearing. The computer program also includes computer readable program code for determining multiple families of frequencies corresponding to multiple failure modes of the rolling element bearing. The computer program further includes computer readable program code for generating multiple reconstructed input signals, where each reconstructed input signal is generated using at least one family of frequencies and the frequency-domain signal. In addition, the computer program includes computer readable program code for determining, using the reconstructed input signals, (i) an indicator identifying an overall health of the rolling element bearing and (ii) values identifying likelihoods that the rolling element bearing is suffering from defects associated with the failure modes.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 11C, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
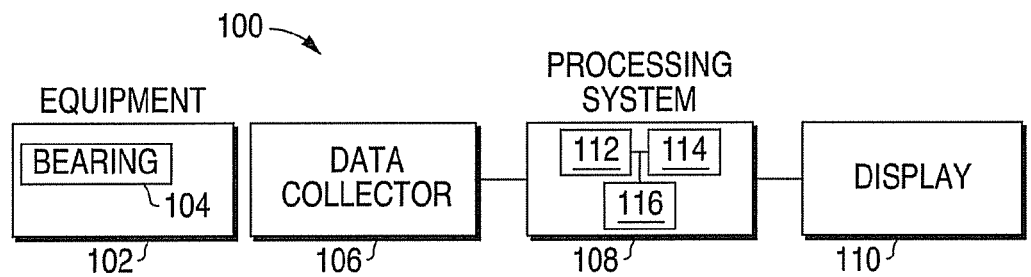
FIG. 1 illustrates an example system for monitoring the health of rolling element bearings according to this disclosure.

FIG. 1 illustrates an example system 100 for monitoring the health of rolling element bearings according to this disclosure. In this example, the system 100 includes a piece of equipment 102 with at least one rolling element bearing 104, a data collector 106, a processing system 108, and a display 110. The piece of equipment 102 generally represents any device, machine, or other equipment having at least one rolling element bearing 104. For example, the piece of equipment 102 could represent a pump, a compressor, or a turbine. The rolling element bearing 104 generally represents a structure facilitating rotation of a larger element in the equipment 102. In some embodiments, the rolling element bearing 104 may include bearing balls, a cage, an inner race, and an outer race. Note, however, that any suitable type of bearing system for supporting rotation could be used here.

The data collector 106 represents any suitable device, system, or other component for collecting data associated with the equipment 102 or its rolling element bearings 104. For example, the data collector 106 could include a vibration sensor that takes vibration measurements of the equipment 102 or its rolling element bearings 104. The data collector 106 could also include a speed sensor that takes speed measurements of the rate at which an element in the equipment 102 is rotating. The data collector 106 could further include one or more analog-to-digital converters for converting any analog measurements into digital measurements. Any other or additional types of measurements of the equipment 102 or its rolling element bearings 104 could be obtained by the data collector 106.

The processing system 108 represents any suitable processing or computing device or system for detecting problems with one or more rolling element bearings 104 based on data from one or more data collectors 106. The processing system 108 could, for example, include a processor, microprocessor, microcontroller, field programmable gate array, digital signal processor, or other processing or control device 112. The processing system 108 could also include one or more memories 114 storing instructions and data used, generated, or collected by the processing system 108. The processing system 108 could further include at least one interface 116 facilitating communications with the data collector 106, the display 110, or other external component(s). The at least one interface 116 could include an Ethernet or other wired network interface or an IEEE 802.11, BLUETOOTH, or other wireless interface.

The display 110 represents any suitable display for presenting information to a user, such as a liquid crystal display (LCD), light emitting diode (LED) display, or cathode ray tube (CRT) display. Any suitable information could be presented to the user. This could include notifications or alarms when problems with the rolling element bearings 104 are detected, reminders that problems with the rolling element bearings 104 were previously detected, and analysis results generated by the processing system 108. The display 110 could represent a stand-alone display or a display in a larger device or system, such as a display in a control room, a display in or coupled to a computing device, or a display in a mobile telephone or other mobile device.

Any suitable connections could be used between the components shown in FIG. 1. For example, the data collector 106 and the processing system 108 could communicate over a wired or wireless connection, and the processing system 108 and the display 110 could communicate over a wired or wireless connection. Also, the components 106-110 shown in FIG. 1 could form a single integrated device, multiple local devices, or multiple distributed devices in one or multiple systems.

In one aspect of operation, the processing system 108 identifies one or more health indicators for one or more rolling element bearings 104. More specifically, the processing system 108 monitors the health of one or more rolling element bearings 104 using signals from the data collectors 106, such as vibration measurements. This technique can be used in a number of industries with a variety of assets or machines that have rolling element bearings, such as pumps, compressors, and turbines. Additional details regarding the specific operations performed by the processing system 108 to monitor the health of and identify problems with one or more rolling element bearings 104 are provided below.

Although FIG. 1 illustrates one example of a system 100 for monitoring the health of rolling element bearings, various changes may be made to FIG. 1. For example, the equipment 102 could include any number of rolling element bearings 104. Also, the system 100 could include any number of pieces of equipment 102, data collectors 106, processing systems 108, and displays 110. In addition, the processing system 108 could analyze data associated with any number of pieces of equipment 102.

Figure 2:
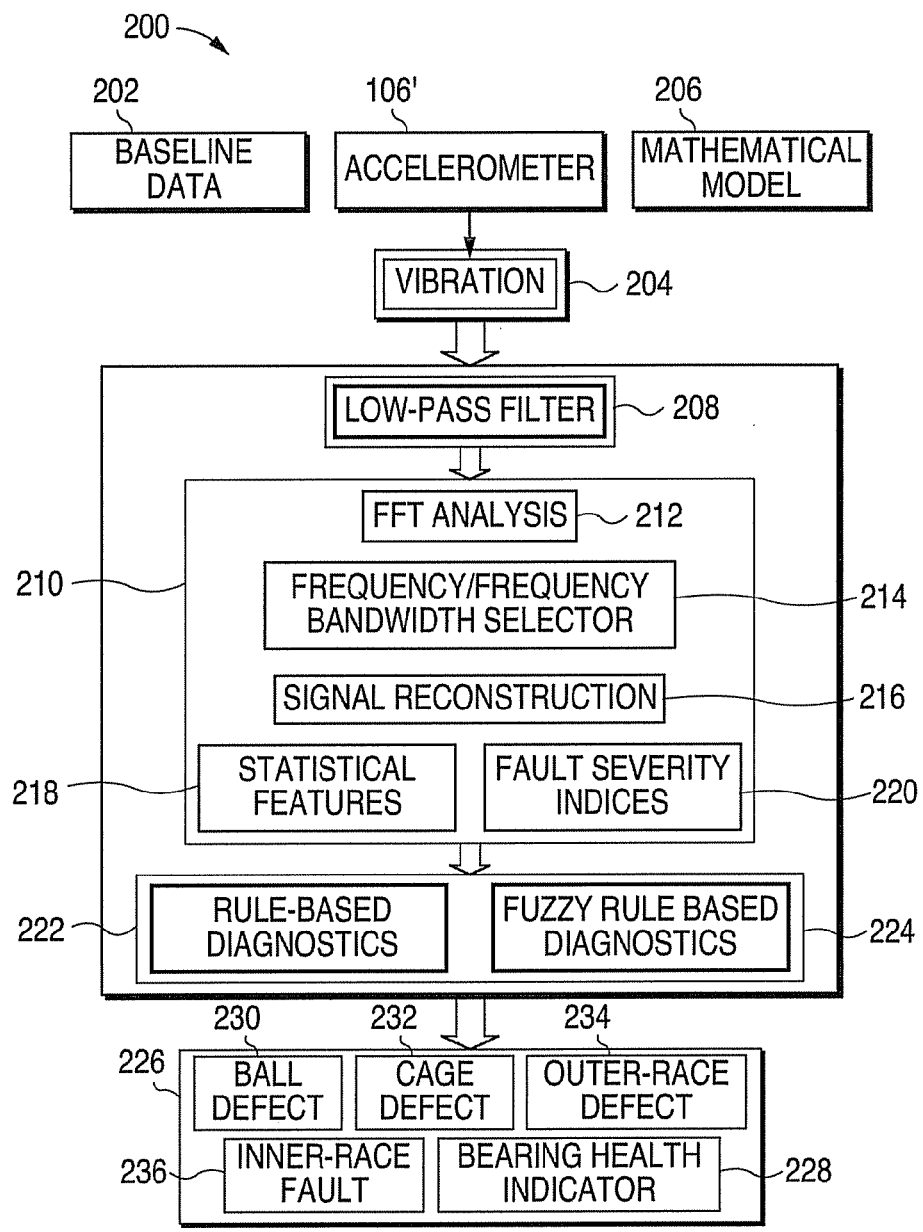
FIG. 2 illustrates an example bearing health monitoring device according to this disclosure.

FIG. 2 illustrates an example bearing health monitoring device 200 according to this disclosure. The bearing health monitoring device 200 could, for example, represent or be implemented within the processing system 108 of FIG. 1. The bearing health monitoring device 200 could also operate using data from the data collector 106 in FIG. 1.

In this example, the bearing health monitoring device 200 receives various input data, such as baseline data 202 associated with normal operation of a rolling element bearing 104 or with a defective bearing 104 (where the defective condition will increase in severity over time). The bearing health monitoring device 200 also receives current or real-time sensor data 204 from one or more data collectors 106', such as vibration data from an accelerometer or other vibration sensor or speed data from a speed sensor. Any other suitable data could be collected, such as audible noise, voltage readings, or electrical current flowing through a component. The sensor data 204 could represent any suitable data having any suitable bandwidth(s), such as acceleration data having a bandwidth of 0-10 kHz or Once Per Revolution (OPR) data having a bandwidth of 0-5 kHz. The OPR data represents data collected during each revolution of the rolling element bearing 104. The bearing health monitoring device 200 further receives a mathematical model 206 defining the signal patterns associated with different types of faults in a rolling element bearing 104.

At least some of this data is filtered in a pre-processing filter 208, which in this example represents a low-pass filter. Any suitable low-pass filter could be used, such as a Butterworth filter or wavelet-based filters using various wavelets. The filtering helps to produce a signal of a particular frequency bandwidth (such as 0-1 kHz or 0-2 kHz). In particular embodiments, an operator can select the frequency bandwidth depending upon his or her expert knowledge of the system being monitored.

The data is analyzed using a processor core 210 to generate various fault indices identifying the likelihood of different faults and to generate an overall health indicator for a rolling element bearing 104. In this example, the processor core 210 includes one or more processors that include or otherwise provide various functions. These functions include a fast Fourier transform (FFT) analysis function 212, a frequency/frequency bandwidth selection (FFBS) function 214, a signal reconstruction function 216, a statistical feature determination function 218, and a fault severity index determination function 220. The processor core 210 is also able to perform a rule-based diagnostic function 222 and an artificial intelligence-based diagnostic function 224. These diagnostics are performed to generate one or more output values 226.

The bearing health monitoring device 200 operates based on the concept that different types of defects (such as inner race, outer race, ball, and cage defects) have specific frequency characteristics. The energy content of input signals therefore changes depending on the defect or defects affecting a rolling element bearing. The FFT analysis function 212 performs a fast Fourier transform to convert time-domain signals into frequency-domain signals. It can also perform amplitude demodulation so that the effects of a carrier frequency are reduced or eliminated, allowing the modulating frequencies to be highlighted.

The FFBS function 214 isolates one or more frequencies and amplitudes that will be used in the signal reconstruction function 216 to reconstruct one or more signals. For example, the FFBS function 214 could isolate only those frequencies related to inner race, outer race, ball, and cage defect frequencies. Therefore, contributions from other frequency components can be reduced or eliminated. The signal reconstruction function 216 reconstructs one or more time-domain signals using the isolated frequencies and their respective amplitudes.

The statistical feature determination function 218 determines one or more statistical features of each reconstructed signal. In some embodiments, the statistical features may include Root Mean Square (RMS), Kurtosis, standard deviation, mean, skew, correlation dimension (CD) statistic, D statistic (D-Stat), autoregressive (AR) coefficient, or form/crest factor values. The fault severity index determination function 220 determines one or more fault severity index values associated with each reconstructed signal and/or a baseline signal (baseline data 202). The fault severity index values could represent any suitable values, such as the difference between a specified frequency and sideband frequencies.

The rule-based diagnostic function 222 and the artificial intelligence-based diagnostic function 224 apply various rules to the statistical features and/or the fault severity index values. These rules may include Fuzzy Logic-based rules (such as those having various combinations of membership functions and that apply various aggregation and defuzzification methods). The results of the diagnostics may include a final health indicator 228 for a rolling element bearing 104 and values 230-236 identifying the likelihood of different types of faults.

In some embodiments, the health indicator 228 represents a single value that reflects the health of a rolling element bearing 104, independent of the particular failure mode of the bearing. In other words, the single indicator 228 represents the overall health of the bearing and therefore the likelihood of any fault or defect existing in the rolling element bearing. However, the bearing health monitoring device 200 can also identify the root cause of deteriorating health of a bearing, such as a crack, indentation, or other problem in the outer race, inner race, ball, or cage of the bearing. These are reflected in the values 230-236 generated by the bearing health monitoring device 200. This classification or isolation of faults may facilitate, for example, easy refurbishment of the bearing if required.

The health indicator 228 can act as a severity index (such as a value that varies between 0 and 1) to identify the severity of a failure of a bearing. The health indicator 228 and the related values 230-236 can also be used in any suitable manner. For example, the health indicator 228 and the related values 230-236 could be trended with time to view their changes over a given interval. The health indicator 228 and the related values 230-236 can also be stored in a database to create a historical record of the health for a rolling element bearing 104. The health indicator 228 and the related values 230-236 could further be compared to one or more thresholds to identify if any problems exist. If a problem is found, field personnel or other personnel can be alerted of possible or existing damage to the bearing. In addition, the health indicator 228 and the related values 230-236 could be used to automatically shut down a piece of equipment 102, schedule maintenance, or otherwise take corrective action.

Although FIG. 2 illustrates one example of a bearing health monitoring device 200, various changes may be made to FIG. 2. For example, the functional division shown in FIG. 2 is for illustration only. Various functions or components could be combined, further subdivided, added, or omitted according to particular needs.

Figure 3:
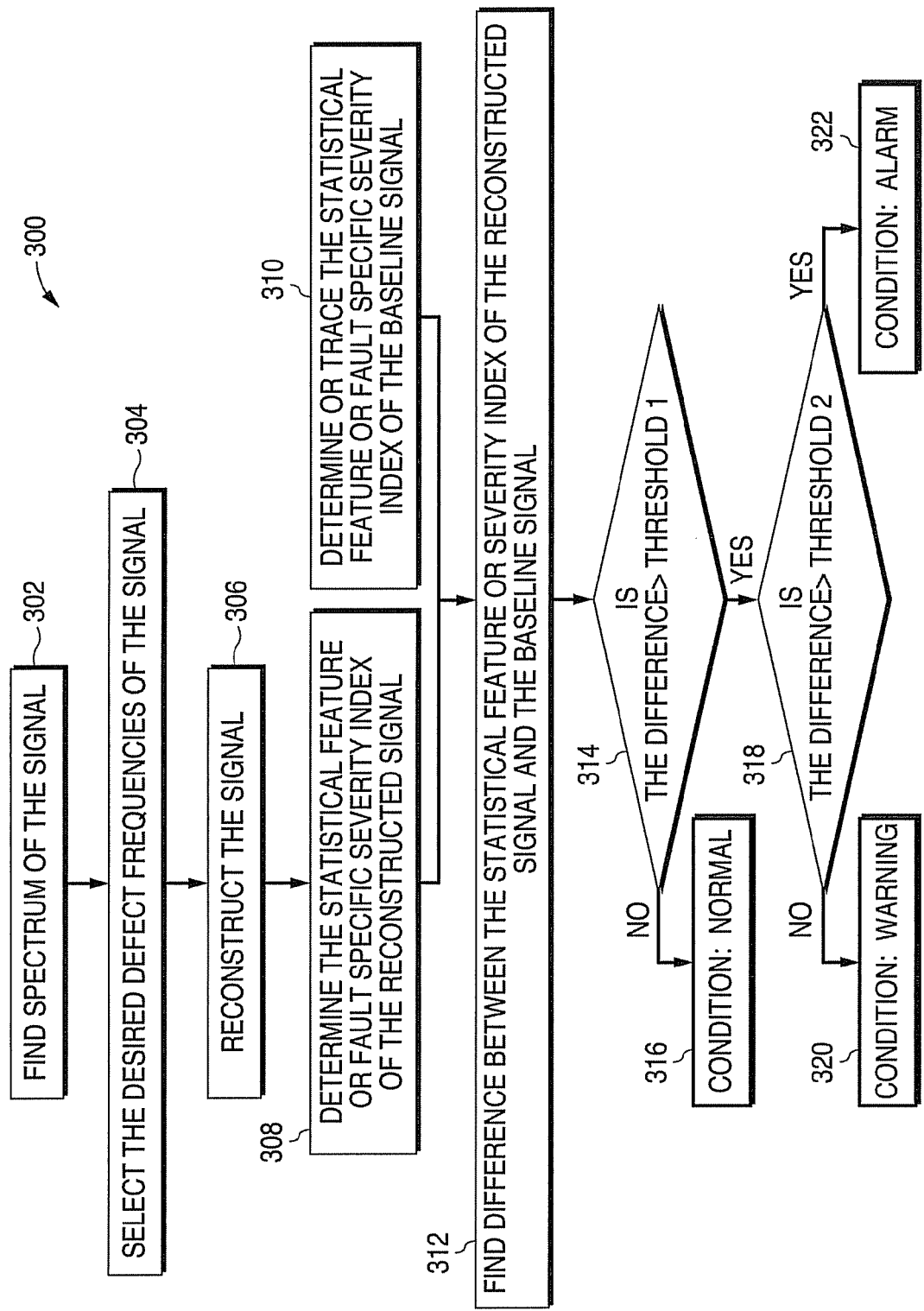
FIG. 3 illustrates an example method for identifying health indicators for rolling element bearings using rule-based diagnostics according to this disclosure.

FIG. 3 illustrates an example method 300 for identifying health indicators for rolling element bearings using rule-based diagnostics according to this disclosure. In this example, the method 300 is described as being used by the bearing health monitoring device 200 to process vibration and speed signals to determine the state of a bearing 104. The method 300 could be used by any other suitable device or system and may involve the processing of any other or additional data.

As shown in FIG. 3, a spectrum of a signal is identified at step 302. This could include, for example, the processor core 210 performing the FFT analysis function 212 on data from one or more sensors. This converts the data from the time domain into the frequency domain, where the spectrum of the signal is identified. Desired defect frequencies of the signal are selected at step 304. This could include, for example, the processor core 210 performing the FFBS function 214 to select one or more appropriate defect frequencies or frequency bands (including a family of frequencies for each defect frequency) based on the possible failure mode(s) of the bearing. A signal is reconstructed at step 306. This could include, for example, the processor core 210 performing the signal reconstruction function 216 based on the frequencies or frequency bands identified by the FFBS function 214. The signal reconstruction could, for example, involve adding the amplitudes at the selected frequencies or in the selected frequency bands.

A statistical feature and/or a fault severity index value is determined for the reconstructed signal at step 308. This could include, for example, the processor core 210 performing the statistical feature determination function 218 or the fault severity index determination function 220 using the reconstructed signal. A statistical feature and/or a fault severity index value is determined for a baseline signal at step 310. This could include, for example, the processor core 210 performing the statistical feature determination function 218 or the fault severity index determination function 220 using the baseline signal represented by the baseline data 202. A difference between the statistical features and/or a difference between the fault severity index values of the reconstructed and baseline signals is determined at step 312.

A determination is made whether the identified difference is greater than a first (lower) threshold at step 314. If not, a normal condition is detected at step 316, and appropriate action can be taken (such as generating an output indicating that no fault has been detected). If so, a determination is made whether the identified difference is greater than a second (higher) threshold at step 318. If not, a warning condition is detected at step 320, and appropriate action can be taken (such as generating an output warning an operator that a possible fault is developing or has developed). Otherwise, an alarm condition is detected at step 322, and appropriate action can be taken (such as generating an alarm notifying an operator that a fault has developed).

Although FIG. 3 illustrates one example of a method 300 for identifying health indicators for rolling element bearings using rule-based diagnostics, various changes may be made to FIG. 3. For example, while shown as using two thresholds, any number of thresholds could be used in FIG. 3. Also, FIG. 3 illustrates the use of a difference between two statistical features and/or a difference between two fault specific severity indexes. However, the statistical features or fault specific severity indexes could be used in other ways to identify a health indicator for a rolling element bearing. In addition, various steps in FIG. 3 could overlap, occur in parallel, occur multiple times, or occur in a different order.

Figure 4:
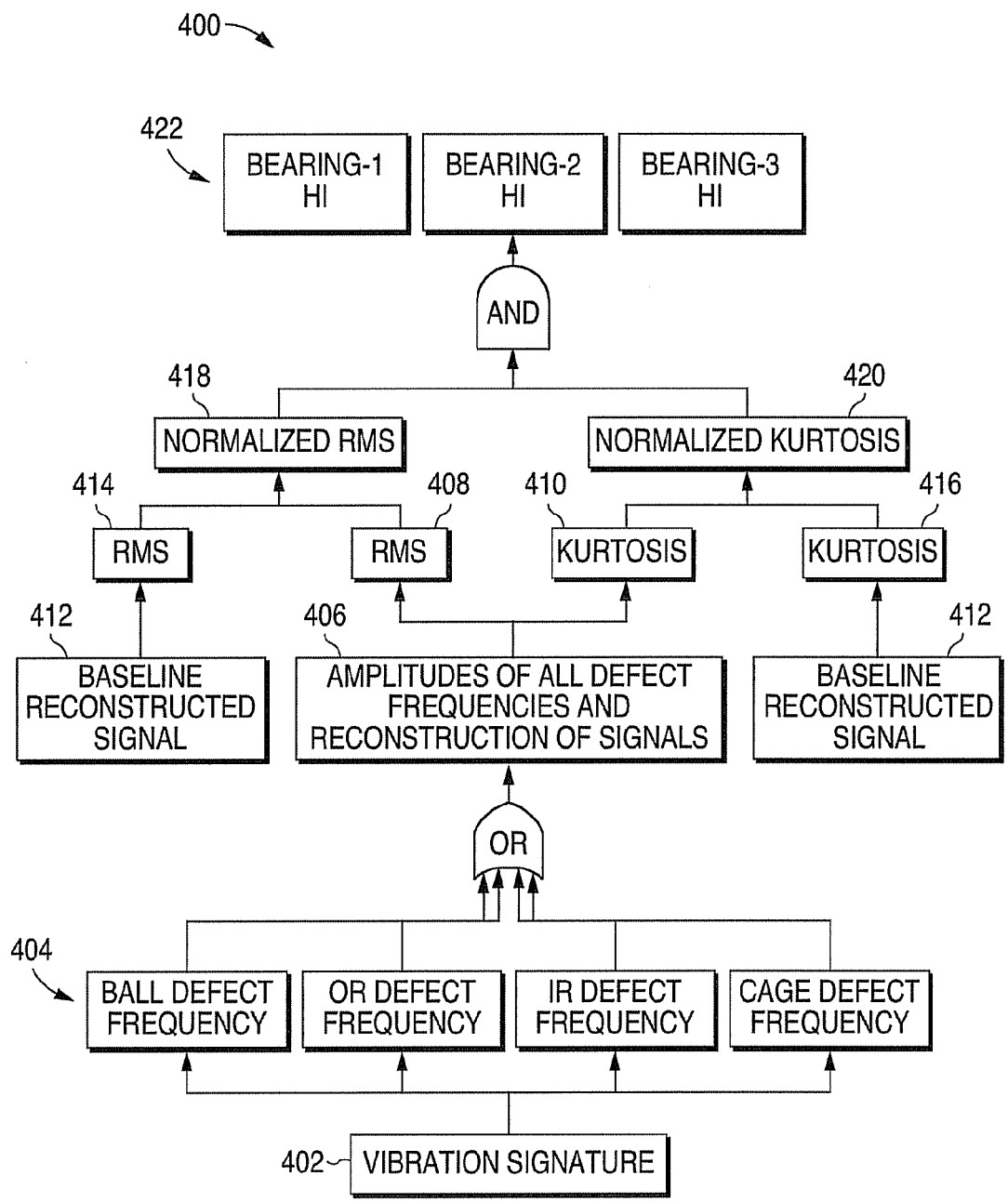
FIG. 4 illustrates an example information flow in the bearing health monitoring device according to this disclosure.

FIG. 4 illustrates an example information flow 400 in the bearing health monitoring device 200 according to this disclosure. As shown in FIG. 4, an input signal 402 represents data associated with operation of a rolling element bearing 104. In this particular example, the input signal 402 represents a vibration signature of the bearing.

The input signal 402 (after FFT) includes various frequencies 404, including a ball defect frequency, an outer race (OR) defect frequency, an inner race (IR) defect frequency, and a cage defect frequency. These frequencies 404 can be used to identify a set of data 406, which includes amplitudes of the defect frequencies 404 in one or more reconstructed signals. This data 406 is used to produce two statistical values, namely RMS and Kurtosis values 408-410. Also, one or more baseline signals 412 are used to produce two statistical values, namely baseline RMS and Kurtosis values 414-416. The RMS values 408 and 414 can be used to produce normalized RMS values 418, and the Kurtosis values 410 and 416 can be used to produce normalized Kurtosis values 420. In particular embodiments, the normalized values 418-420 can be expressed as:

$$RMS_{Normalized} = \frac{RMS_{Reconstructed\ (Original)\ Signal}}{RMS_{Reconstructed\ (Baseline)\ Signal}}; \text{ and}$$

$$Kurtosis_{Normalized} = \frac{Kurtosis_{Reconstructed\ (Original)\ Signal}}{Kurtosis_{Reconstructed\ (Baseline)\ Signal}}.$$

Here, the "original" signal represents the input signal 402, and the "baseline" signal represents the baseline signal 412. The normalized values 418-420 can then be used in combination to calculate a health indicator (HI) 422 for one or more bearings. As a particular example, Fuzzy Inference can be applied to the normalized values 418-420 to obtain the health indicators 422.

Although FIG. 4 illustrates one example of an information flow 400 in the bearing health monitoring device 200, various changes may be made to FIG. 4. For example, any number of defect frequencies 404 could be analyzed, and any other or additional statistics could be used.

Figures 5, 6:
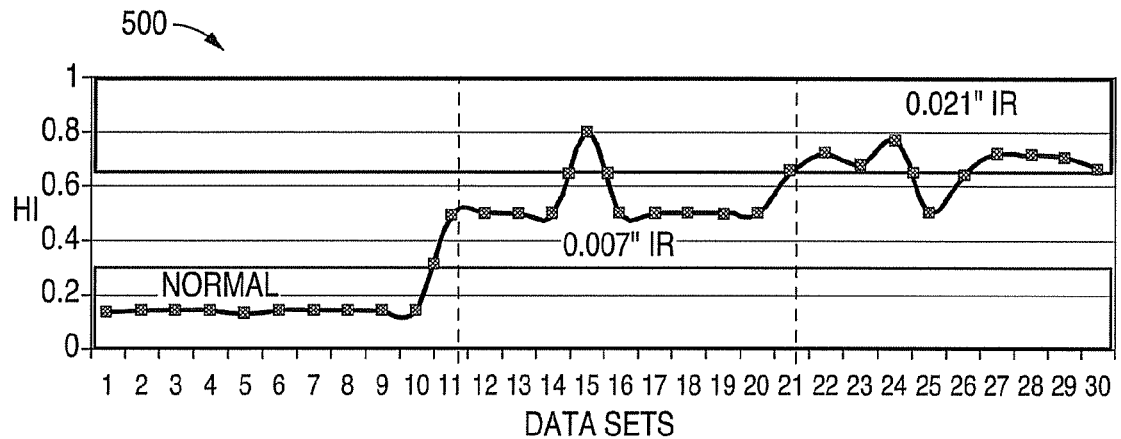
FIG. 5 illustrates an example graph plotting bearing health indicators according to this disclosure.
FIG. 6 illustrates an example table used to reconstruct a signal in order to determine a bearing health indicator according to this disclosure.

FIG. 5 illustrates an example graph 500 plotting bearing health indicators according to this disclosure. As shown in FIG. 5, the health indicator (HI) value for a rolling element bearing 104 is determined multiple times using multiple data sets. A lower threshold is placed around an HI value of 0.33, and an upper threshold is placed around an HI value of 0.66. In this example, the HI value is initially in the good range until the bearing 104 begins suffering from an inner race (IR) fault, namely a 0.007 inch indentation in the inner race. The HI value then increases and remains above the lower threshold for a period of time until the bearing begins suffering from a more severe inner race fault, namely a 0.021 inch indentation in the inner race. At that point, the HI value increases and substantially remains above the upper threshold.

The use of multiple thresholds may allow different courses of action to be taken depending on the severity of the detected problem. For example, the lower threshold could represent a warning threshold, where personnel are simply notified of the possible problem. The upper threshold could represent an alarm threshold, where an alarm is generated and repair or replacement of the bearing is initiated. Of course, other or additional thresholds could be used, and any suitable course of action could be taken for each threshold.

Although FIG. 5 illustrates one example of a graph 500 plotting bearing health indicators, various changes may be made to FIG. 5. For example, the number of thresholds and the specific values of the thresholds are for illustration only.

FIG. 6 illustrates an example table 600 used to reconstruct a signal in order to determine a bearing health indicator according to this disclosure. As noted above, the bearing health monitoring device 200 uses various defect frequencies of a rolling element bearing (including a family of frequencies for each defect frequency) to identify a bearing health indicator. In particular embodiments, defect frequencies of a bearing can be calculated in terms of speed (such as by using the first principles method). A family of frequencies related to each failure mode of the bearing (outer race, inner race, ball, or cage defect) can be determined in any suitable manner. For example, a family of frequencies can include harmonics of a particular defect frequency and sidebands of the defect frequency due to modulation by other defect frequencies. The use of this type of family of frequencies can help to reduce the uncertainty about the harmonics or sidebands excited due to a defect. In particular embodiments, a family of frequencies for a particular defect frequency can be expressed as:

$$f_i; f_i \pm f_r; f_i \pm 2f_r; f_i \pm f_b; f_i \pm 2f_b$$

$$2f_i; 2f_i \pm f_r; 2f_i \pm 2f_r; 2f_i \pm f_b; 2f_i \pm 2f_b$$

$$\ldots$$

$$n_h f_i; n_h f_i \pm f_r; n_h f_i \pm 2f_r; n_h f_i \pm f_b; n_h f_i \pm 2f_b$$

where $f_i$ denotes the particular defect frequency, $f_r$ denotes the frequency of rotation, and $f_b$ denotes sideband frequencies. Also, $n_h$ denotes the number of harmonics to be included in the family, which can be computed by dividing the upper limit of the frequency band of the filtered input signal (received from the pre-processing filter 208) by $f_i$. Note that a frequency band, such as a band of 1 Hz or 1.5 Hz, could be used with and centered on each frequency in a family of frequencies. This can help to compensate for slight fluctuations in the defect frequency, such as fluctuations caused by supply line fluctuations, manufacturing errors, installation errors, speed changes, slippage of the bearing balls in the bearing, and changes in load, shaft weight, or defect condition.

With this in mind, the bearing health monitoring device 200 decomposes the filtered input signal into the frequency domain using any suitable technique, such as a Fourier series, FFT (as is shown in FIG. 2), Laplace transform, or Z-transform. The amplitudes of each respective family of defect frequencies can be extracted from the decomposed signal. The table 600 shown in FIG. 6 includes a column 602 identifying frequencies in an example family of frequencies (for an inner race defect) and a column 604 identifying amplitudes of the decomposed input signal at those frequencies. This forms a matrix of values for this particular defect, and the matrix can be used to reconstruct a signal for that individual failure mode (with its respective frequencies and amplitudes). The matrices for multiple failure modes can also be used to reconstruct a signal for the whole bearing (such as by performing a union of the families of frequencies and their amplitudes). In particular embodiments, a signal can be reconstructed as follows:

$$x(t) = \sum_{i=1}^{n} A_i \sin(2\pi f_i t)$$

where x(t) denotes the reconstructed signal, $A_i$ denotes the amplitude of the ith frequency, and n denotes the number of frequencies being combined. Using signal reconstruction can help in improving the signal-to-noise ratio of the input signal being analyzed.

Figure 7A:
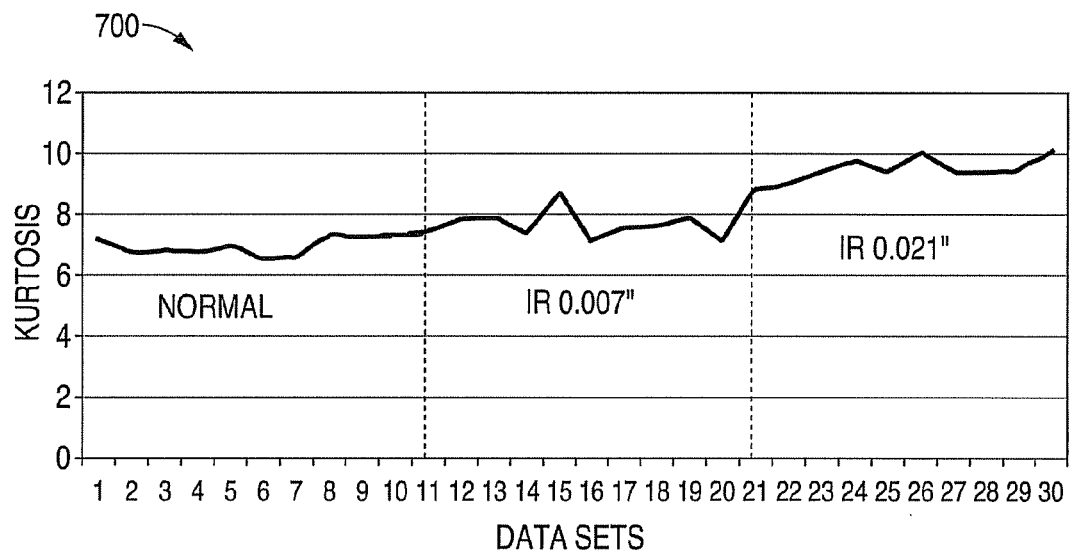
FIGS. 7A and 7B illustrate example statistics for identifying health indicators for rolling element bearings according to this disclosure.
Figure 7B:
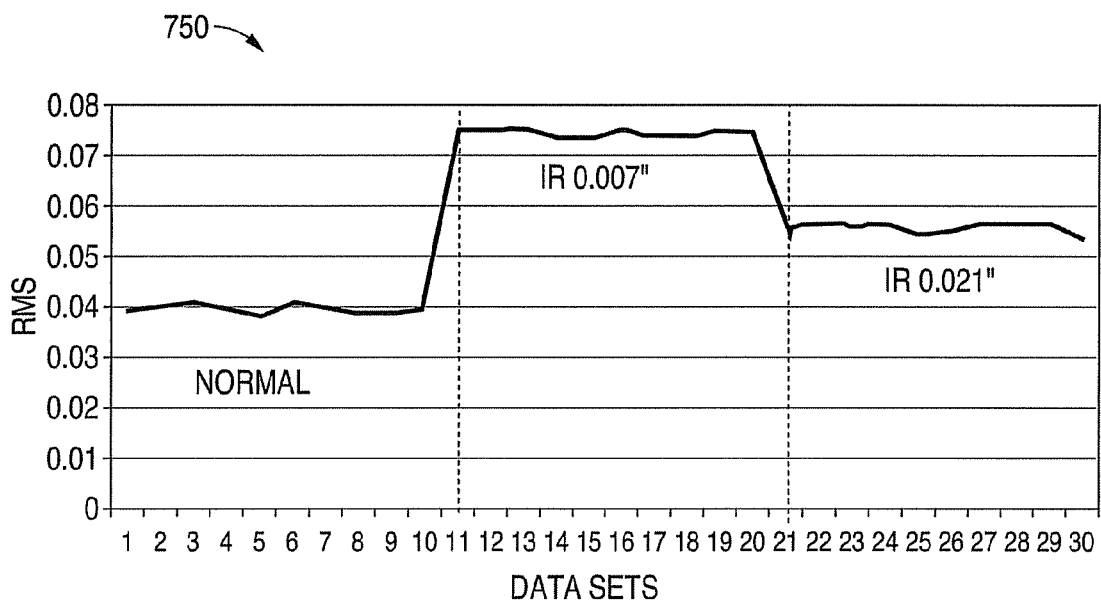

At this point, statistics (such as RMS and Kurtosis values) can be calculated using the reconstructed signal. An example of these statistics is shown in FIGS. 7A and 7B, where FIG. 7A illustrates Kurtosis values for a bearing over time and FIG. 7B illustrates RMS values for the bearing over time. These statistics relate to the health indicator values shown in FIG. 5. As a result, there are periods where the bearing is operating normally, suffering from a 0.007 inch indentation in the inner race, and suffering from a 0.021 inch indentation in the inner race.

The computed statistics can be normalized with respect to a baseline reconstructed signal, which allows the bearing health monitoring device 200 to operate uniformly across different pieces of equipment, such as equipment with different capacities. A feature fusion technique can then be applied to the normalized values, such as Fuzzy Logic, Dempster-Shafer, or Bayesian feature fusion, to determine the final value of the health indicator 228.

Figure 8:
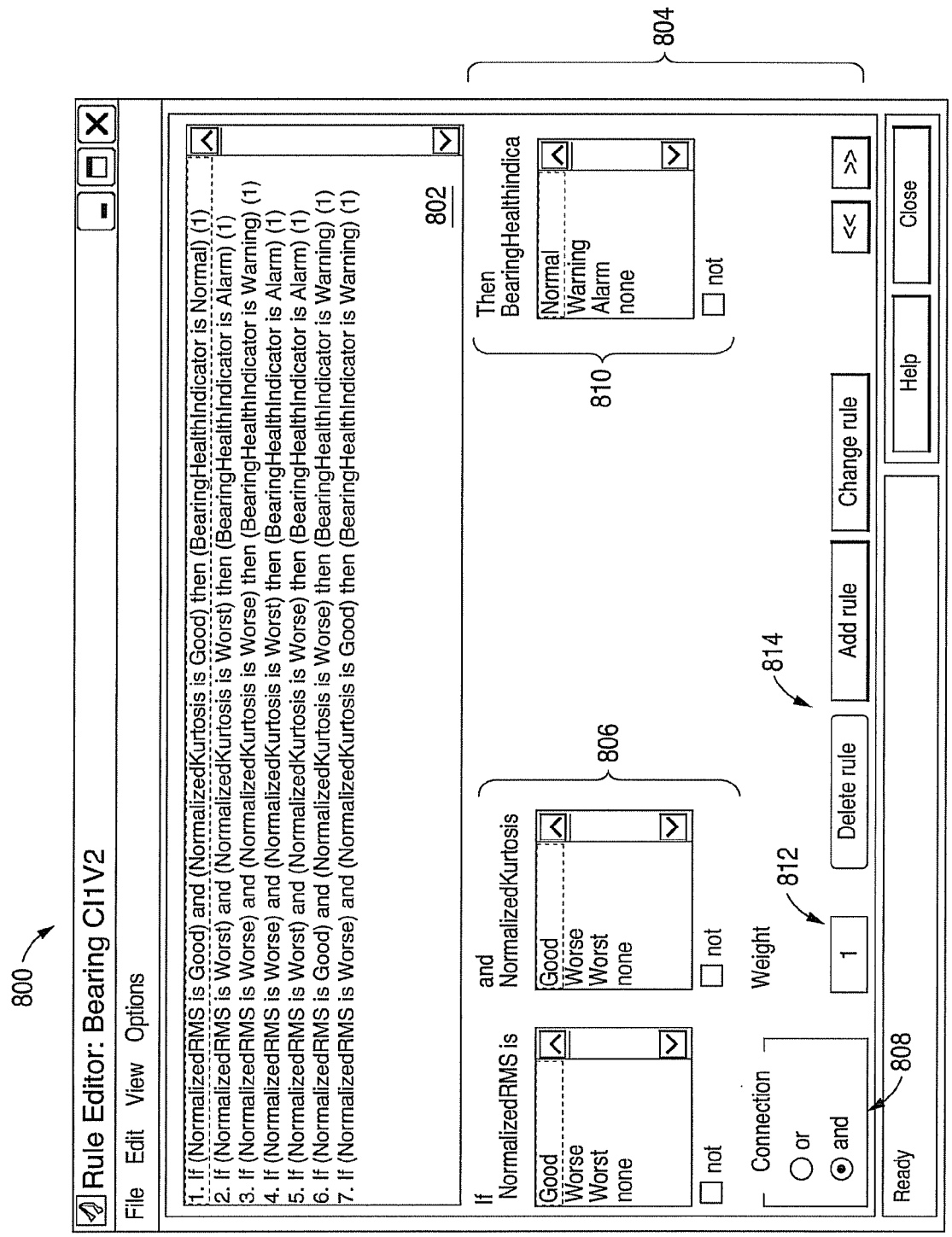
FIG. 8 illustrates an example graphical user interface used to define rules for analyzing statistics related to rolling element bearings in accordance with this disclosure.

FIG. 8 illustrates an example graphical user interface 800 used to define rules for analyzing statistics related to rolling element bearings in accordance with this disclosure. These rules can be used to apply a Fuzzy Logic feature fusion to the normalized statistical values to determine the final value of the health indicator 228.

As shown in FIG. 8, the graphical user interface 800 includes a defined rule area 802, which identifies Fuzzy Logic rules that have already been defined by one or more users. The graphical user interface 800 also includes a control area 804, which can be used to define new rules or to remove or modify existing rules. For example, the control area 804 includes controls 806 (used to define two conditions associated with the normalized RMS and Kurtosis values), controls 808 (used to indicate whether one or both conditions need to be satisfied), and controls 810 (used to define an action). Together, these controls 806-810 can be used to define the various rules shown in the defined rule area 802, as well as new rules. A control 812 can be used to weight or rank the defined rules, and controls 814 can be used to delete, add, or change rules.

Note that any other or additional rules could be used here. For example, a rule could specify that a normalized RMS value greater than four results in an alarm condition (regardless of the normalized Kurtosis value). Also, other or additional conditions could be specified using appropriate controls. For instance, if an alarm appears three consecutive times, the alarm can be marked as being confirmed.

Although FIGS. 6 through 8 illustrate examples of a table, statistics, and a graphical user interface related to determining health indicators for rolling element bearings, various changes may be made to these figures. For example, the values shown in FIGS. 6, 7A, and 7B are for illustration only. Also, any other suitable mechanism could be used to define rules for analyzing statistics related to rolling element bearings.

Figure 9C:
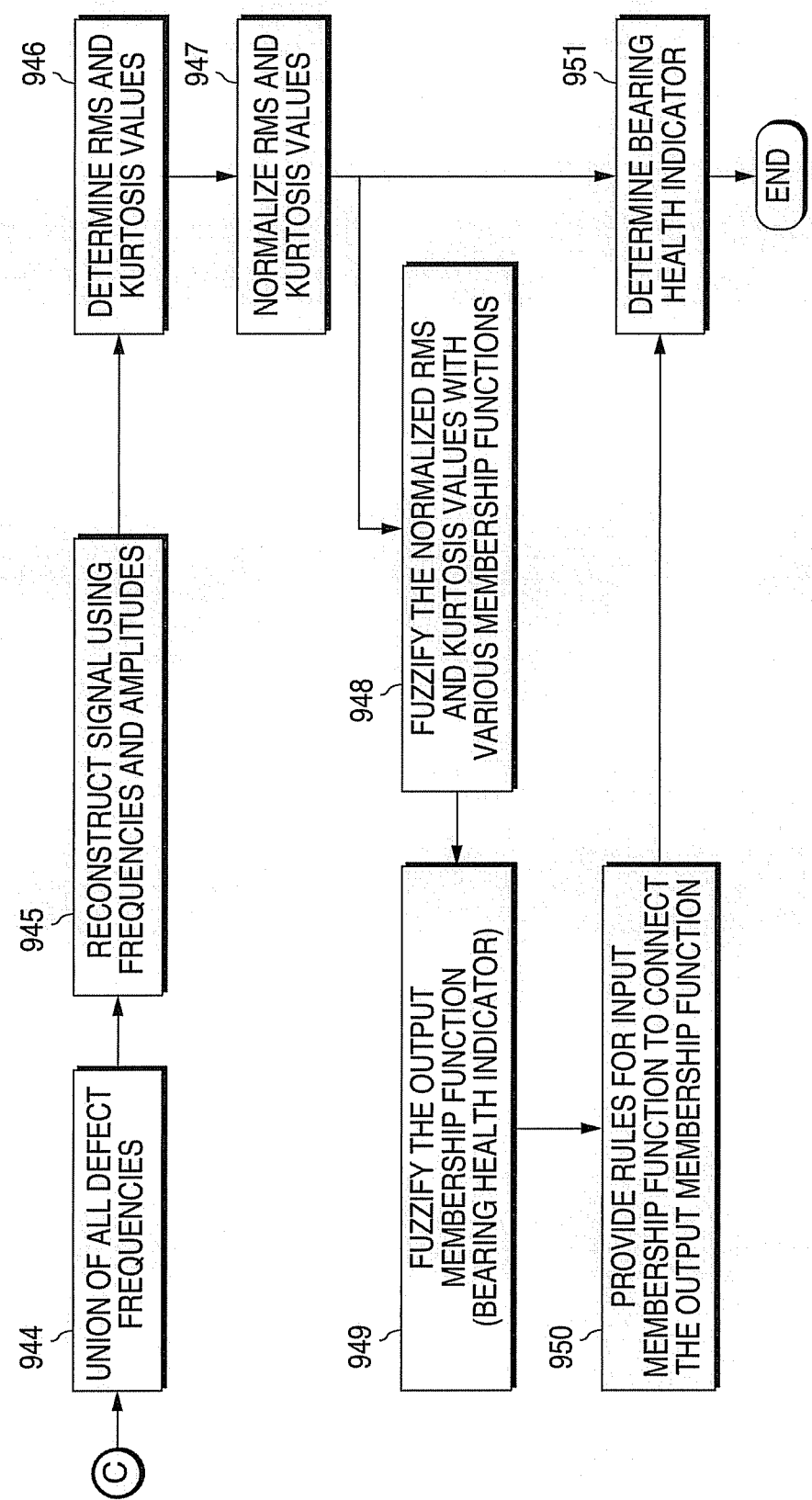
FIGS. 9A through 11C illustrate a more detailed example method and related details for identifying health indicators for rolling element bearings according to this disclosure.
Figures 10, 11A:
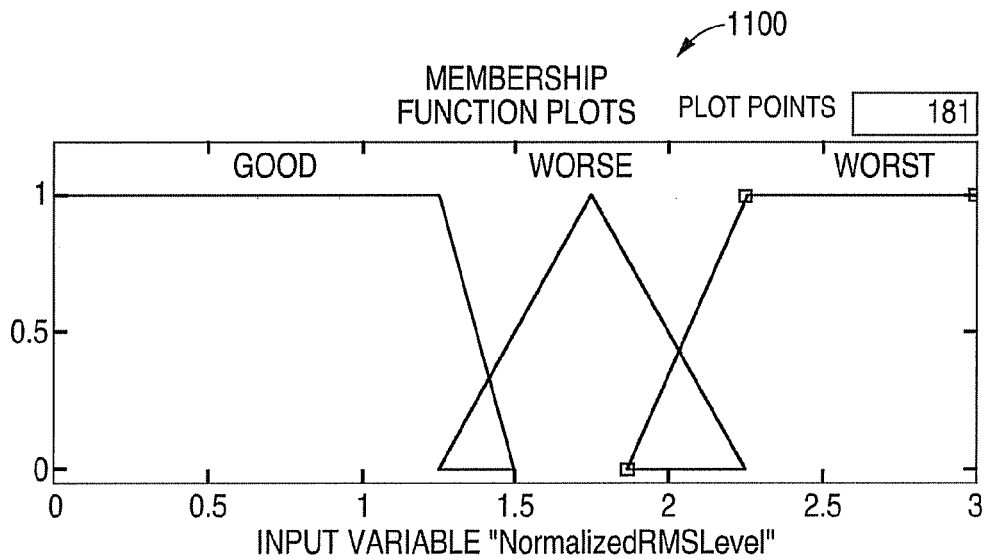
Figure 11B:
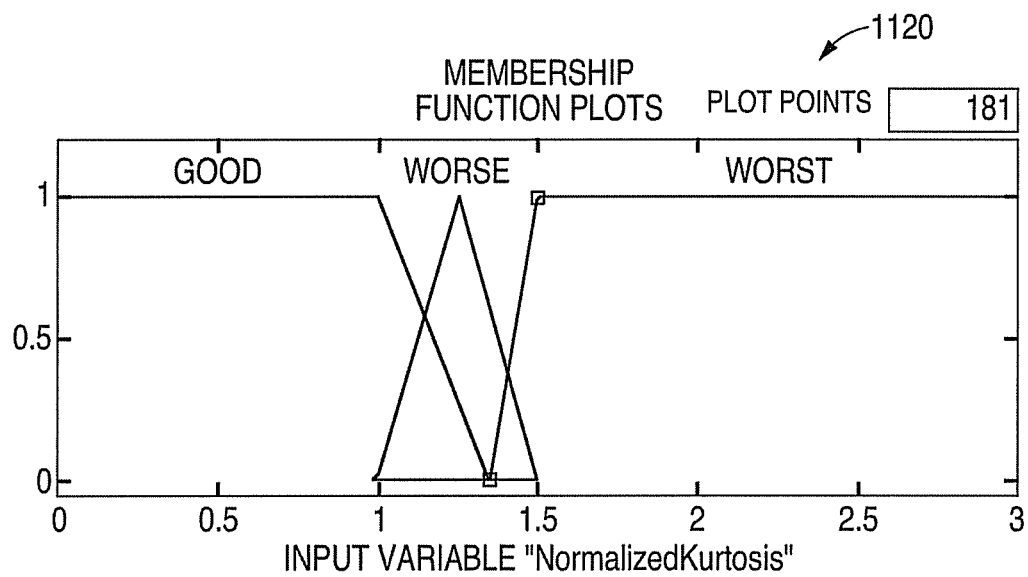
Figure 11C:
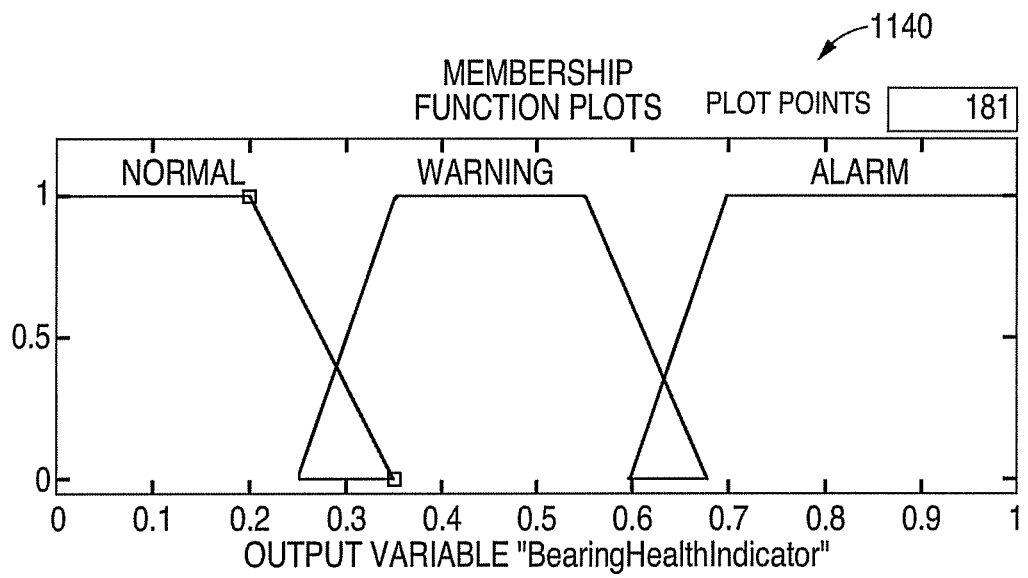

FIGS. 9A through 11C illustrate a more detailed example method and related details for identifying health indicators for rolling element bearings according to this disclosure. In particular, FIGS. 9A through 9C illustrate an example method 900 for identifying health indicators for rolling element bearings. FIG. 10 illustrates an example table 1000 containing thresholds associated with different classes of machines, and FIGS. 11A through 11C illustrate different example Fuzzy Logic membership functions.

As shown in FIG. 9A, the bearing health monitoring device 200 receives configuration data at step 901. The configuration data can include user-customizable configurations, such as a lower frequency limit $F_L$, an upper frequency limit $F_H$, a filter type, and a Hanning window for the pre-processing filter 208. The user-customizable configurations may also include a desired sampling frequency $F_S$ and a desired number of samples N for sampling an input signal. The configuration data can also include system configurations defining the equipment being monitored, such as a pump or motor rating, a class of machine, bearing specifications, and a natural frequency of the equipment being monitored. The configuration data may further include sensor and data acquisition (DAQ) configurations defining the sensors and other equipment used to capture information, such as parameters associated with DAQ equipment, accelerometers, current transformers, voltage probes, or OPRs.

The bearing health monitoring device 200 then goes through a series of checks to validate the received configuration data. For example, the bearing health monitoring device 200 verifies whether the desired number of samples N is less than a maximum number of samples ($N_S$) at step 902 and, if not, outputs a warning instructing a user to reduce the desired number of samples at step 903. The bearing health monitoring device 200 verifies whether the upper frequency limit $F_H$ is less than half the desired sampling frequency $F_S$ at step 904 and, if not, outputs a warning instructing the user to reduce the upper frequency limit $F_H$ at step 905. The bearing health monitoring device 200 verifies whether the upper frequency limit $F_H$ is less than the natural frequency $F_N$ of an accelerometer at step 906 and, if not, outputs a warning instructing the user to reduce the upper frequency limit $F_H$ at step 907.

If and when validated configuration data is obtained, the bearing health monitoring device 200 collects accelerometer data at step 908 and OPR data at step 909. The OPR data is processed as shown in FIG. 9B. The accelerometer data is filtered at step 910, and the filtered accelerometer data is processed as shown in FIG. 9B.

The filtered accelerometer data is also analyzed to calculate statistic values (such as RMS values) for the accelerometer data at step 911. A determination is made whether the computed statistics indicate that the accelerometer's maximum rating has been exceeded at step 912. If so, a message is presented instructing the user to replace the accelerometer at step 913. Otherwise, the velocity and displacement of the equipment being monitored, as well as the RMS value of the velocity, are determined at step 914. These values can be determined using the filtered accelerometer data.

The computed RMS value of the velocity is compared against one or more threshold values associated with the appropriate class of machine at step 915. Example thresholds associated with different classes of machines are shown in the table 1000 in FIG. 10. As can be seen in FIG. 10, different thresholds are provided for the RMS value of velocity (denoted $V_{rms}$) and used to define the vibration "severity" (good, satisfactory, unsatisfactory, or unacceptable) of the equipment. In step 915, the bearing health monitoring device 200 can use the specific class of machine for the equipment being monitored and the calculated $V_{rms}$ value to determine the vibration severity of the equipment. The results of the comparison are then used to determine the condition of the equipment being monitored at step 916, such as by determining whether the equipment is suffering from excessive vibrations.

The OPR data collected at step 909 is processed as shown in FIG. 9B. Here, the number of harmonics for each failure mode is determined at step 918. In step 918, $n_{ir}$, $n_{or}$, $n_b$, and $n_c$ denote the numbers of harmonics for an inner race defect, an outer race defect, a ball defect, and a cage defect, respectively. Also, $f_{ir}$, $f_{or}$, $f_b$, and $f_c$ denote the defect frequencies for an inner race defect, an outer race defect, a ball defect, and a cage defect, respectively. The family of frequencies (FoF) for each failure mode is determined at step 919. Each family of frequencies could include the harmonics and sidebands of a particular defect frequency, as well as that particular defect frequency.

The filtered accelerometer data is subject to FFT analysis at step 920, which converts the data from the time domain into the frequency domain. At this point, a determination is made whether all of the FoF frequencies are less than 1 kHz at step 921. If so, the maximum amplitude at each FoF frequency (within a ±1 Hz window) is determined at step 922. If not, a determination is made whether all of the FoF frequencies are less than 2 kHz at step 923. If so, the maximum amplitude at each FoF frequency (within a ±1.5 Hz window) is determined at step 924. Otherwise, the maximum amplitude at each FoF frequency (within another window) is determined at step 925. The amplitudes and frequencies are used to form a matrix at step 926.

At this point, the values in the matrix are analyzed to determine fault indicators for individual fault modes in FIG. 9B. For an inner race defect, a signal is reconstructed using all inner race defect frequencies at step 927, and statistical features (such as RMS and Kurtosis values) are determined for the reconstructed signal at step 928. Normalized RMS and Kurtosis values are determined at step 929, which may involve using RMS and Kurtosis values for a baseline signal. The likelihood of an inner race defect is then determined using the normalized RMS and Kurtosis values at step 930. For example, the likelihood of an inner race defect could be determined as shown in Table 1.

TABLE 1

| If | Then |
| --- | --- |
| Normalized RMS<2.6 AND Normalized Kurtosis<2.8 | Likelihood is low (condition is normal) |
| Normalized RMS>2.8 AND Normalized Kurtosis>3.0 | Likelihood is high (trigger alarm) |
| Otherwise | Likelihood is moderate (trigger warning) |

In Table 1, the "otherwise" condition is met if at least one of the normalized values is above its lower threshold and below its upper threshold.

Similarly, for an outer race defect, a signal is reconstructed using all outer race defect frequencies at step 931, and statistical features (such as RMS and Kurtosis values) are determined for the reconstructed signal at step 932. Normalized RMS and Kurtosis values are determined at step 933, which may involve using RMS and Kurtosis values for a baseline signal. The likelihood of an outer race defect is then determined using the normalized RMS and Kurtosis values at step 934. For example, the likelihood of an outer race defect could be determined as shown in Table 2.

TABLE 2

| If | Then |
| --- | --- |
| Normalized RMS<2.8 AND Normalized Kurtosis<2.0 | Likelihood is low (condition is normal) |
| Normalized RMS>4.5 AND Normalized Kurtosis>2.8 | Likelihood is high (trigger alarm) |
| Otherwise | Likelihood is moderate (trigger warning) |

In Table 2, the "otherwise" condition is met if at least one of the normalized values is above its lower threshold and below its upper threshold.

Further, for a bearing ball defect, a signal is reconstructed using all ball defect frequencies at step 935, and statistical features (such as RMS and Kurtosis values) are determined for the reconstructed signal at step 936. Normalized RMS and Kurtosis values are determined at step 937, which may involve using RMS and Kurtosis values for a baseline signal. The likelihood of a ball defect is then determined using the normalized RMS and Kurtosis values at step 938. For example, the likelihood of a ball defect could be determined as shown in Table 3.

TABLE 3

| If | Then |
| --- | --- |
| Normalized RMS<2.0 AND Normalized Kurtosis<2.0 | Likelihood is low (condition is normal) |
| Normalized RMS>3.0 AND Normalized Kurtosis>2.5 | Likelihood is high (trigger alarm) |
| Otherwise | Likelihood is moderate (trigger warning) |

In Table 3, the "otherwise" condition is met if at least one of the normalized values is above its lower threshold and below its upper threshold.

In addition, for a cage defect, a signal is reconstructed using all cage defect frequencies at step 939, and statistical features (such as RMS and Kurtosis values) are determined for the reconstructed signal at step 940. Normalized RMS and Kurtosis values are determined at step 941, which may involve using RMS and Kurtosis values for a baseline signal. The likelihood of a cage defect is then determined using the normalized RMS and Kurtosis values at step 942. For example, the likelihood of a cage defect could be determined as shown in Table 4.

TABLE 4

| If | Then |
| --- | --- |
| Normalized RMS<2.0 AND Normalized Kurtosis<2.0 | Likelihood is low (condition is normal) |
| Normalized RMS>3.0 AND Normalized Kurtosis>3.0 | Likelihood is high (trigger alarm) |
| Otherwise | Likelihood is moderate (trigger warning) |

In Table 4, the "otherwise" condition is met if at least one of the normalized values is above its lower threshold and below its upper threshold.

The values in the matrix formed at step 926 are also analyzed to determine the overall health indicator for the bearing as shown in FIG. 9C. A union of all defect frequencies occurs at step 944, and a signal is reconstructed using the united frequencies and their amplitudes at step 945. Statistical features (such as RMS and Kurtosis values) are determined for the reconstructed signal at step 946, and normalized RMS and Kurtosis values are determined at step 947 (which may involve using RMS and Kurtosis values for a baseline signal).

The normalized values are then "fuzzified" using one or more Fuzzy Logic membership functions at step 947. This could include fuzzifying one or more Fuzzy Logic output member functions at step 949 and providing rules for one or more Fuzzy Logic input member functions at step 950. Example Fuzzy Logic input member functions 1100 and 1120 are shown in FIGS. 11A and 11B, and an example Fuzzy Logic output member function 1140 is shown in FIG. 11C. Also, the rules could be defined using the graphical user interface 800 shown in FIG. 8. A bearing health indicator is then determined at step 951. The bearing health indicator is determined using the normalized values and the various Fuzzy Logic member functions. The bearing health indicator may, for example, indicate whether the bearing is in a normal, warning, or alarm state.

Although FIGS. 9A through 11C illustrate a more detailed example method 900 and related details for identifying health indicators for rolling element bearings, various changes may be made to FIGS. 9A through 11C. For example, various steps in FIGS. 9A through 9C could overlap, occur in parallel, occur multiple times, or occur in a different order. Also, the values shown in FIG. 10 and the membership functions shown in FIGS. 11A through 11C are for illustration only.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   receiving, by a bearing health monitoring device, an input signal from a vibration sensor, the input signal comprising information associated with at least one of: a rolling element bearing and a piece of equipment containing the rolling element bearing;
   decomposing the input signal into a frequency-domain signal;
   determining multiple families of frequencies corresponding to multiple failure modes of the rolling element bearing, each family of frequencies comprising a defect frequency associated with a particular failure mode and a number of harmonics of the defect frequency;
   generating a first reconstructed input signal using the multiple families of frequencies and the frequency-domain signal;
   generating an additional reconstructed input signal for each failure mode using the family of frequencies associated with that failure mode, wherein generating the additional reconstructed input signal for each failure mode comprises identifying maximum amplitudes of the frequency-domain signal in multiple frequency windows, each frequency window comprising a different frequency range associated with one of the frequencies in the family of frequencies for that failure mode;
   using the additional reconstructed input signal associated with each failure mode to determine a value identifying a likelihood that the rolling element bearing is suffering from a defect associated with that failure mode;
   determining, using the first reconstructed input signal, an indicator identifying an overall health of the rolling element bearing; and
   outputting the indicator to allow a determination regarding a repair or replacement of the rolling element bearing.

2. The method of claim 1, wherein determining the indicator identifying the overall health of the rolling element bearing comprises:
   generating one or more first statistical values or severity index values using the first reconstructed input signal;

generating one or more second statistical values or severity index values using a baseline signal, the baseline signal associated with normal operation of at least one of: the rolling element bearing and the piece of equipment; and determining the indicator using the first and second statistical values or severity index values.

3. The method of claim 2, wherein determining the indicator using the first and second statistical values or severity index values comprises:

determining a difference between the first and second statistical values or severity index values; and determining whether the difference exceeds at least one threshold.

4. The method of claim 1, wherein determining the indicator identifying the overall health of the rolling element bearing comprises:

generating one or more statistical values using the first reconstructed input signal;

normalizing the one or more statistical values using a baseline signal, the baseline signal associated with one of:

normal operation of at least one of: the rolling element bearing and the piece of equipment; and defective operation of at least one of: the rolling element bearing and the piece of equipment, where a severity of the defective operation will increase over time; and determining whether the one or more normalized statistical values exceed one or more thresholds.

5. The method of claim 4, wherein the one or more normalized statistical values comprise multiple statistical values including a normalized root mean square (RMS) value and a normalized Kurtosis value.

6. The method of claim 5, wherein determining whether the one or more normalized statistical values exceed the one or more thresholds comprises:

using one or more Fuzzy Logic input membership functions and one or more Fuzzy Logic output membership functions to process the normalized RMS value and the normalized Kurtosis value.

7. The method of claim 1, wherein generating the first reconstructed input signal comprises:

forming a union using the maximum amplitudes and the frequencies within the multiple families of frequencies.

8. The method of claim 1, wherein the multiple failure modes of the rolling element bearing comprise a failure mode associated with each of an inner race, an outer race, a ball, and a cage of the rolling element bearing.

9. The method of claim 1, wherein the multiple frequency windows comprise at least three frequency windows having a same frequency as a midpoint of the frequency range of each frequency window.

10. An apparatus comprising:

at least one interface configured to receive from a vibration sensor an input signal comprising information associated with at least one of: a rolling element bearing and a piece of equipment containing the rolling element bearing; and at least one processing device configured to:

decompose the input signal into a frequency-domain signal;

determine multiple families of frequencies corresponding to multiple failure modes of the rolling element bearing, each family of frequencies comprising a defect frequency associated with a particular failure mode and a number of harmonics of the defect frequency;

generate a first reconstructed input signal using the multiple families of frequencies and the frequency-domain signal;

generate an additional reconstructed input signal for each failure mode using the family of frequencies associated with that failure mode by identifying maximum amplitudes of the frequency-domain signal in multiple frequency windows, each frequency window comprising a different frequency range associated with one of the frequencies in the family of frequencies for that failure mode;

use the additional reconstructed input signal associated with each failure mode to determine a value identifying a likelihood that the rolling element bearing is suffering from a defect associated with that failure mode;

determine, using the first reconstructed input signal, an indicator identifying an overall health of the rolling element bearing; and output the indicator to allow a determination regarding a repair or replacement of the rolling element bearing.

11. The apparatus of claim 10, wherein the at least one processing device is configured to generate the first reconstructed input signal by forming a union using the maximum amplitudes and the frequencies within the multiple families of frequencies.

12. The apparatus of claim 10, wherein the at least one processing device is configured to determine the indicator identifying the overall health of the rolling element bearing by:

generating one or more statistical values using the first reconstructed input signal;

normalizing the one or more statistical values using a baseline signal, the baseline signal associated with one of:

normal operation of at least one of: the rolling element bearing and the piece of equipment; and defective operation of at least one of: the rolling element bearing and the piece of equipment, where a severity of the defective operation will increase over time; and determining whether the one or more normalized statistical values exceed one or more thresholds.

13. The apparatus of claim 12, wherein the at least one processing device is configured to determine whether the one or more normalized statistical values exceed the one or more thresholds using one or more Fuzzy Logic input membership functions and one or more Fuzzy Logic output membership functions.

14. The apparatus of claim 13, further comprising:

a display configured to present a graphical user interface to a user, the graphical user interface configured to receive information from the user defining the membership functions.

15. The apparatus of claim 10, wherein the multiple failure modes of the rolling element bearing comprise a failure mode associated with each of an inner race, an outer race, a ball, and a cage of the rolling element bearing.

16. The apparatus of claim 10, wherein the multiple frequency windows comprise at least three frequency windows having a same frequency as a midpoint of the frequency range of each frequency window.

17. A non-transitory computer readable storage medium containing a computer program that causes a processing system to perforin a process, the computer program comprising:

computer readable program code configured to cause the processing system to decompose an input signal from a vibration sensor to produce a frequency-domain signal, the input signal comprising information associated with at least one of: a rolling element bearing and a piece of equipment containing the rolling element bearing;

computer readable program code configured to cause the processing system to determine multiple families of frequencies corresponding to multiple failure modes of the rolling element bearing, each family of frequencies comprising a defect frequency associated with a particular failure mode and a number of harmonics of the defect frequency;

computer readable program code configured to cause the processing system to generate a first reconstructed input signal using the multiple families of frequencies and the frequency-domain signal;

computer readable program code configured to cause the processing system to generate an additional reconstructed input signal for each failure mode using the family of frequencies associated with that failure mode by identifying maximum amplitudes of the frequency-domain signal in multiple frequency windows, each frequency window comprising a different frequency range associated with one of the frequencies in the family of frequencies for that failure mode;

computer readable program code configured to cause the processing system to use the additional reconstructed input signal associated with each failure mode to determine a value identifying a likelihood that the rolling element bearing is suffering from a defect associated with that failure mode;

computer readable program code configured to cause the processing system to determine, using the first reconstructed input signal, an indicator identifying an overall health of the rolling element bearing; and computer readable program code configured to cause the processing system to output the indicator to allow a determination regarding a repair or replacement of the rolling element bearing.

18. The non-transitory computer readable storage medium of claim 17, wherein the computer readable program code configured to cause the processing system to determine the indicator identifying the overall health of the rolling element bearing comprises:

computer readable program code configured to cause the processing system to generate statistical values using the first reconstructed input signal;

computer readable program code configured to cause the processing system to normalize the statistical values using a baseline signal, the baseline signal associated with one of:
      normal operation of at least one of: the rolling element bearing and the piece of equipment; and
      defective operation of at least one of: the rolling element bearing and the piece of equipment, where a severity of the defective operation will increase over time; and computer readable program code configured to cause the processing system to determine whether the normalized statistical values exceed specified thresholds.

19. The non-transitory computer readable storage medium of claim 18, wherein the computer readable program code configured to cause the processing system to determine whether the normalized statistical values exceed the specified thresholds comprises:

computer readable program code configured to cause the processing system to use one or more Fuzzy Logic input membership functions and one or more Fuzzy Logic output membership functions to determine the indicator identifying the overall health of the rolling element bearing.

20. The non-transitory computer readable storage medium of claim 18, wherein the multiple failure modes of the rolling element bearing comprise a failure mode associated with each of an inner race, an outer race, a ball, and a cage of the rolling element bearing.

* * * * *